United States Patent
Park

(10) Patent No.: US 12,449,863 B2
(45) Date of Patent: Oct. 21, 2025

(54) FOLDABLE ELECTRONIC DEVICE

(71) Applicant: Samsung Electronics Co., Ltd., Suwon-si (KR)

(72) Inventor: Sinyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 18/486,387

(22) Filed: Oct. 13, 2023

(65) Prior Publication Data

US 2024/0053803 A1 Feb. 15, 2024

Related U.S. Application Data

(63) Continuation of application No. PCT/KR2022/006643, filed on May 10, 2022.

(30) Foreign Application Priority Data

May 25, 2021 (KR) .................. 10-2021-0067057

(51) Int. Cl.
G06F 1/16 (2006.01)
(52) U.S. Cl.
CPC .......... G06F 1/1681 (2013.01); G06F 1/1652 (2013.01)
(58) Field of Classification Search
CPC combination set(s) only.
See application file for complete search history.

(56) References Cited

U.S. PATENT DOCUMENTS

| | | | |
|---|---|---|---|
| 5,734,513 | A | 3/1998 | Wang et al. |
| 9,201,464 | B2 | 12/2015 | Uchiyama et al. |
| 9,557,771 | B2 | 1/2017 | Park et al. |
| 9,598,886 | B2 | 3/2017 | Kasai et al. |
| 10,303,223 | B2 | 5/2019 | Park et al. |
| 10,345,858 | B2 | 7/2019 | Han et al. |
| 10,677,387 | B2 | 6/2020 | Han et al. |
| 10,827,633 | B2 * | 11/2020 | Yoo ........................ H05K 1/189 |

(Continued)

FOREIGN PATENT DOCUMENTS

| | | |
|---|---|---|
| CN | 106486010 B | 6/2020 |
| CN | 111322307 A | 6/2020 |

(Continued)

OTHER PUBLICATIONS

Extended European Search Report dated Sep. 24, 2024 for EP Application No. 22811527.5.

(Continued)

*Primary Examiner* — Lisa Lea-Edmonds
(74) *Attorney, Agent, or Firm* — Nixon & Vanderhye P.C.

(57) ABSTRACT

An electronic device may include a hinge structure and a housing connected to the hinge structure. The hinge structure may include a shaft member and an arm structure connected to the shaft member and the housing such that the housing is rotatable. A guide hole, which extends in a direction substantially perpendicular to the rotation axis of the housing, may be formed in the housing. The arm structure may include a protruding portion accommodated in the guide hole. The protruding portion may slidably move inside the guide hole in accordance with the rotation of the housing. Another embodiment identified through the specification is possible.

16 Claims, 17 Drawing Sheets

(56) References Cited

U.S. PATENT DOCUMENTS

| | | |
|---|---|---|
| 11,175,695 B2 | 11/2021 | Lin |
| 11,231,754 B2 | 1/2022 | Kang et al. |
| 11,516,932 B2 | 11/2022 | Sim et al. |
| 11,537,173 B2 | 12/2022 | Kim et al. |
| 11,614,780 B2 | 3/2023 | Kim et al. |
| 11,662,781 B2 | 5/2023 | Kang et al. |
| 11,886,254 B2* | 1/2024 | Kim ...................... G06F 1/1641 |
| 11,889,006 B2* | 1/2024 | Kim ...................... H04M 1/022 |
| 12,316,791 B2* | 5/2025 | Liao ...................... G06F 1/1681 |
| 2013/0135809 A1 | 5/2013 | Uchiyama et al. |
| 2014/0290009 A1 | 10/2014 | Kasai et al. |
| 2015/0366089 A1 | 12/2015 | Park et al. |
| 2018/0024596 A1 | 1/2018 | Park et al. |
| 2018/0324964 A1* | 11/2018 | Yoo ...................... G06F 1/1652 |
| 2020/0081487 A1 | 3/2020 | Lin |
| 2020/0124229 A1 | 4/2020 | Han et al. |
| 2020/0375046 A1 | 11/2020 | Sim et al. |
| 2021/0041921 A1 | 2/2021 | Kang et al. |
| 2022/0113770 A1 | 4/2022 | Kang et al. |
| 2022/0206543 A1* | 6/2022 | Kim ...................... G06F 1/1641 |
| 2022/0311843 A1* | 9/2022 | Kim ........................ F16C 11/04 |
| 2022/0361350 A1* | 11/2022 | Jung ...................... G06F 1/1681 |
| 2023/0107816 A1* | 4/2023 | Yoo ...................... H05K 5/0226 |
| | | 361/679.01 |
| 2023/0296129 A1* | 9/2023 | Kim ...................... G06F 1/1681 |
| | | 361/807 |
| 2024/0053803 A1* | 2/2024 | Park ...................... G06F 1/1681 |
| 2025/0093916 A1* | 3/2025 | Hsu ....................... G06F 1/1652 |
| 2025/0142749 A1* | 5/2025 | Noh ...................... G06F 1/1679 |

FOREIGN PATENT DOCUMENTS

| | | |
|---|---|---|
| CN | 211239892 U | 8/2020 |
| CN | 212407298 U | 1/2021 |
| KR | 20180010019 A | 1/2018 |
| KR | 20180010557 A | 1/2018 |
| KR | 20190079033 A | 7/2019 |
| KR | 20200101241 A | 8/2020 |
| KR | 20200126524 A | 11/2020 |

OTHER PUBLICATIONS

Saudi Arabian Office Action dated Nov. 3, 2024 for SA Application No. 523451463.
International Search Report for PCT/KR2022/006643 mailed Aug. 12, 2022, 4 pages.
Written Opinion of the ISA for PCT/KR2022/006643 mailed Aug. 12, 2022, 4 pages.
Russian Office Action dated Jul. 18, 2025 for RU Application No. 2023128556.

* cited by examiner

FIG. 6

FOLDABLE ELECTRONIC DEVICE

CROSS-REFERENCE TO RELATED APPLICATIONS

This application is a continuation of International Application No. PCT/KR2022/006643, filed on May 10, 2022, designating the United States, in the Korean Intellectual Property Receiving Office, and claiming priority to KR 10-2021-0067057 filed on May 25, 2021, the disclosures of which are all hereby incorporated by reference herein in their entireties.

BACKGROUND

Field

Certain example embodiments relate to a foldable electronic device.

Description of Related Art

An electronic device capable of varying its volume depending on a use environment, for example, a foldable electronic device is being developed. The foldable electronic device may include a first housing, a second housing, and a hinge structure. The first housing and the second housing may be connected to the hinge structure so as to be rotatable with the hinge structure therebetween. The foldable electronic device may be folded or unfolded while the first housing and the second housing rotate relative to the hinge structure. A flexible display, which is at least partially deformable, may be disposed on the first housing and the second housing. The flexible display may be deformed in response to a folding operation of the foldable electronic device.

SUMMARY

A space in which components are movable to fold or unfold the foldable electronic device may be provided in the first housing, the second housing, and the hinge structure. Furthermore, gaps may occur between the components due to dimensional tolerances or assembly tolerances. Therefore, not only movement for providing a folding operation of the electronic device, such as rotation of the first housing and the second housing, but also movement irrelevant to the folding operation of the electronic device may occur. For example, when an external force is applied to the first housing and/or the second housing, such as when the foldable electronic device is dropped to the ground, the first housing and the second housing may unnecessarily move. For example, when an external force is applied to the first housing in a first direction, the first housing may move in the first direction, and the second housing may move in a direction opposite to the first direction in a reaction to the first housing. Due to the movement of the first housing and the second housing, the first housing, the second housing, and the hinge structure may be damaged, and stress caused by the movement of the first housing and the second housing may be transmitted to other components to cause damage to the components. For example, the stress may be applied to the flexible display disposed on the first housing and the second housing to cause damage such as disconnection of an internal circuit of the flexible display.

Certain example embodiments may provide a foldable electronic device for reducing or preventing or reducing movement of a first housing and a second housing and damage to components due to the movement of the first housing and the second housing.

An electronic device capable of a folding and/or unfolding operation according to an example embodiment may include a hinge structure and a housing connected, directly or indirectly, to the hinge structure. The hinge structure may include a shaft member and an arm structure connected, directly or indirectly, to the shaft member and the housing such that the housing is rotatable. A guide hole that extends in a direction substantially perpendicular to a rotational axis of the housing may be formed in the housing. The arm structure may include a protrusion accommodated in the guide hole. The protrusion may slide within the guide hole depending on (or based on) rotation of the housing.

An electronic device according to an example embodiment may include a hinge structure, a first housing and a second housing connected to the hinge structure with the hinge structure therebetween, and a flexible display disposed across the first housing, the hinge structure, and the second housing. The hinge structure may include a first shaft member, a second shaft member, a first arm structure connected, directly or indirectly, to the first shaft member and the first housing such that the first housing is rotatable, and a second arm structure connected, directly or indirectly, to the second shaft member and the second housing such that the second housing is rotatable. A first guide hole that extends in a direction substantially perpendicular to a rotational axis of the first housing may be formed in the first housing, and the first arm structure may include a first protrusion accommodated in the first guide hole. A second guide hole that extends in a direction substantially perpendicular to a rotational axis of the second housing may be formed in the second housing, and the second arm structure may include a second protrusion accommodated in the second guide hole. The first protrusion may slide within the first guide hole depending on (or based on) rotation of the first housing, and the second protrusion may slide within the second guide hole depending on (or based on) rotation of the second housing.

In certain example embodiments, the protrusion of the hinge structure accommodated in the guide hole of the housing may decrease movement of the housing, thereby reducing and/or preventing damage to a component due to the movement of the housing.

In addition, the disclosure may provide various effects that are directly or indirectly recognized.

BRIEF DESCRIPTION OF DRAWINGS

The above and other aspects, features, and advantages of certain example embodiments will be more apparent from the following detailed description, taken in conjunction with the accompanying drawings, in which:

FIG. 6 is a back perspective view illustrating a flat state of the hinge structure according to an example embodiment.

With regard to description of the drawings, identical or similar reference numerals may be used to refer to identical or similar components.

DETAILED DESCRIPTION

Hereinafter, various embodiments of the disclosure will be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
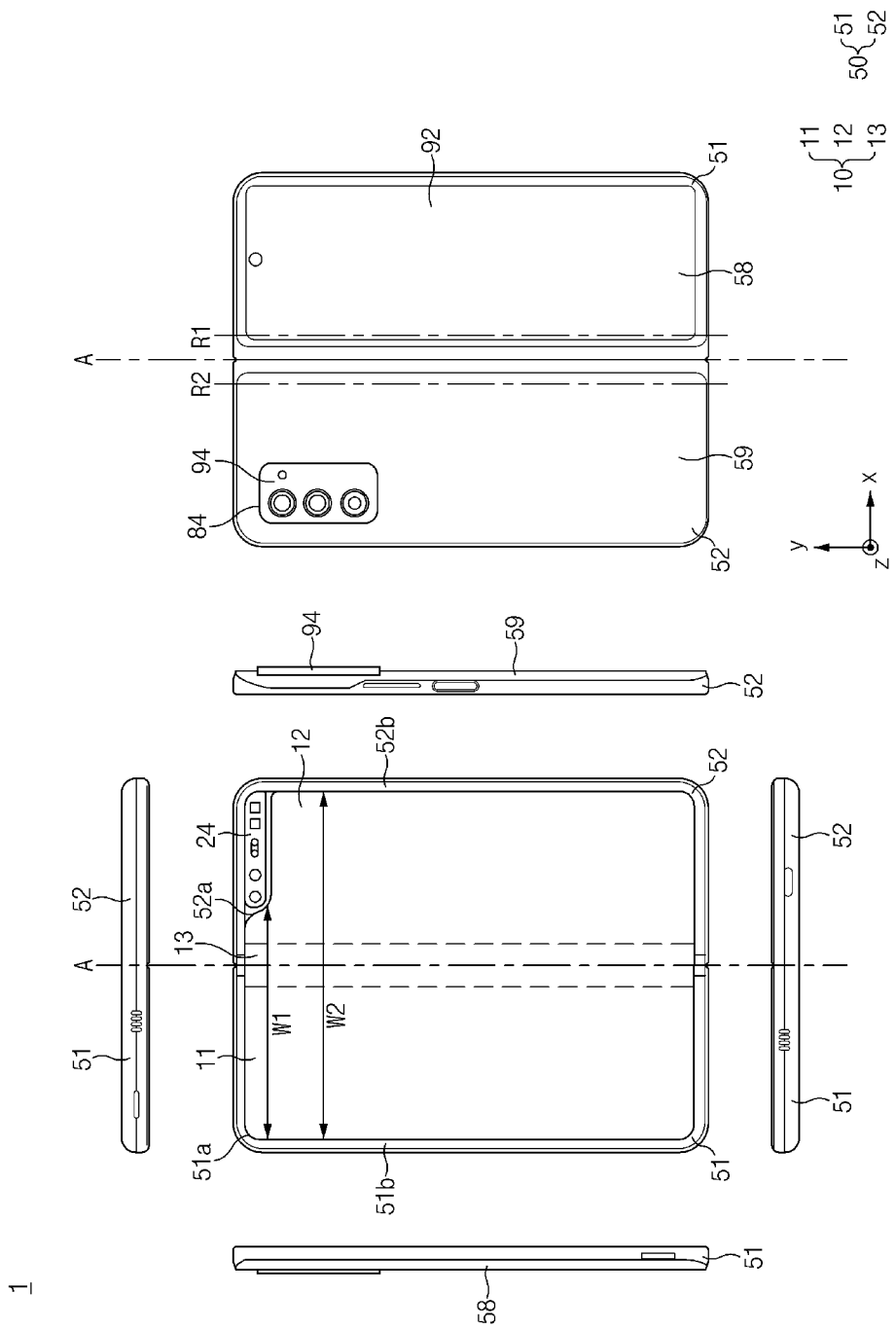
FIG. 1 is a view illustrating a flat state of an electronic device according to an example embodiment.

FIG. 1 is a view illustrating a flat state of an electronic device according to an example embodiment.

Figure 2:
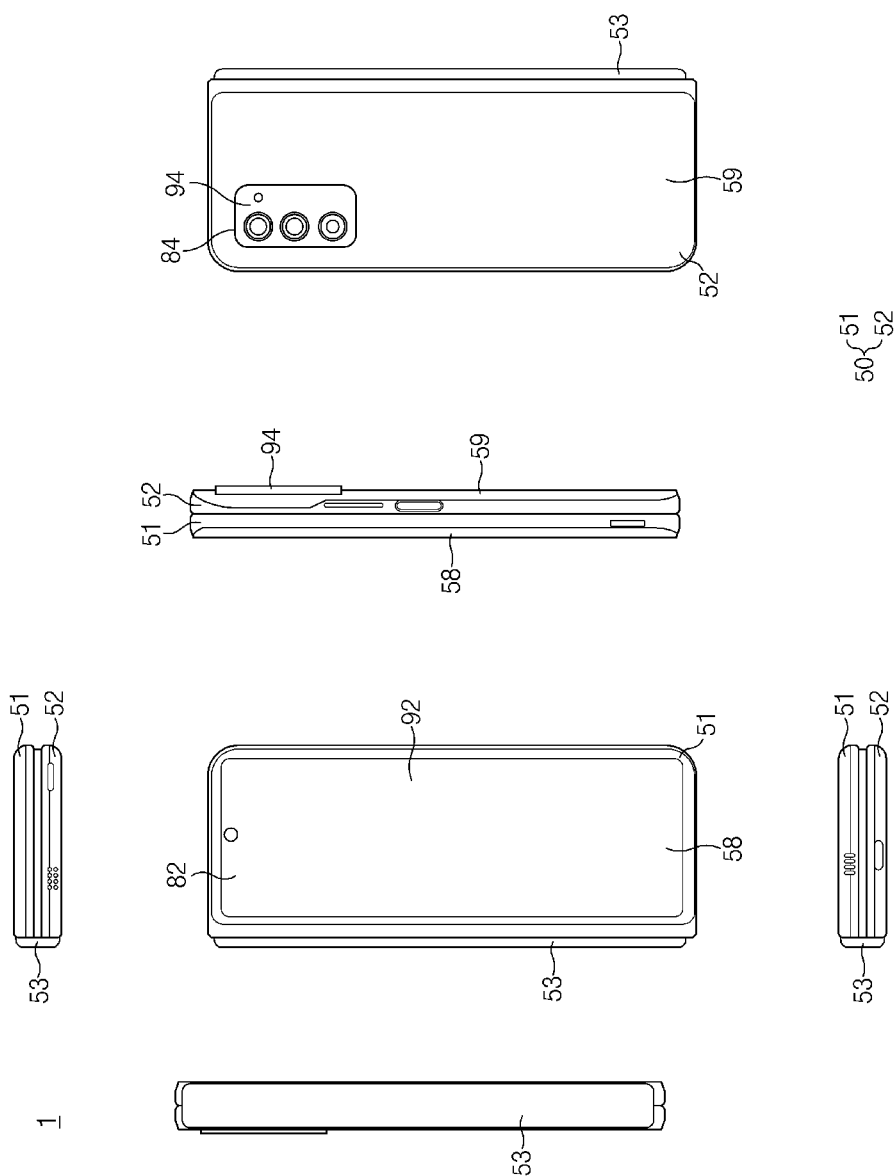
FIG. 2 is a view illustrating a folded state of the electronic device according to an example embodiment.

FIG. 2 is a view illustrating a folded state of the electronic device according to an example embodiment.

Referring to FIGS. 1 and 2, the electronic device 1 according to an embodiment may include a foldable housing 50, a hinge cover 53 that covers a foldable portion of the foldable housing, and a flexible or foldable display 10 (hereinafter, abbreviated to the "display" 10) that is disposed in a space formed by the foldable housing 50. In this disclosure, a surface on which the display 10 is disposed is defined as a first surface or a front surface of the electronic device 1. A surface facing away from the front surface is defined as a second surface or a rear surface of the electronic device 1. A surface surrounding a space between the front surface and the rear surface is defined as a third surface or a side surface of the electronic device 1.

In an embodiment, the foldable housing 50 may include a first housing 51 (or, a "first housing structure" 51), a second housing 52 (or, a "second housing structure" 52) including a sensor area 24, a first back cover 58, and a second back cover 59. The foldable housing 50 of the electronic device 1 is not limited to the form and coupling illustrated in FIGS. 1 and 2 and may be implemented by a combination and/or coupling of other shapes or components. For example, in another embodiment, the first housing 51 and the first back cover 58 may be integrally formed with each other, and/or the second housing 52 and the second back cover 59 may be integrally formed with each other.

In the illustrated embodiment, the first housing 51 and the second housing 52 may be disposed on opposite sides of a folding axis (an axis A) and may have shapes entirely symmetrical to each other with respect to the folding axis A. As will be described below, the angle or distance between the first housing 51 and the second housing 52 may vary depending on whether the electronic device 1 is in a flat state, a folded state, or an intermediate state. In the illustrated embodiment, unlike the first housing 51, the second housing 52 may additionally include the sensor area 24 in which various sensors are disposed. However, the first housing 51 and the second housing 52 may have mutually symmetrical shapes in the other areas.

In an embodiment, the first housing 51 and the second housing 52 may together form a recess accommodating the display 10. In an embodiment, due to the sensor area 24, the recess may have two or more different widths in a direction perpendicular to the folding axis A. For example, the recess may have a first width $W_1$ between a first portion 51a of the first housing 51 that is parallel to the folding axis A and a first portion 52a of the second housing 52 that is formed at the periphery of the sensor area 24 and a second width $W_2$ formed by a second portion 51b of the first housing 51 and a second portion 52b of the second housing 52 that does not correspond to the sensor area 24 and that is parallel to the folding axis A. In this case, the second width $W_2$ may be greater than the first width $W_1$. In other words, the first portion 51a of the first housing 51 and the first portion 52a of the second housing 52 that have mutually asymmetrical shapes may form the first width $W_1$ of the recess, and the second portion 51b of the first housing 51 and the second portion 52b of the second housing 52 that have mutually symmetrical shapes may form the second width $W_2$ of the recess. In an embodiment, the first portion 52a and the second portion 52b of the second housing 52 may have different distances from the folding axis A. The width of the recess is not limited to the illustrated example. In an embodiment, the recess may have at least one width depending on the form of the sensor area 24 or the symmetrical and/or asymmetrical portions of the first housing 51 and the second housing 52.

In an embodiment, at least a portion of the first housing 51 and at least a portion of the second housing 52 may be formed of a metallic material or a non-metallic material that has rigidity greater than the rigidity of the display to support the display 10.

In an embodiment, the sensor area 24 may be formed to have a predetermined area adjacent to one corner of the second housing 52. However, the arrangement, shape, and size of the sensor area 24 are not limited to the illustrated example. For example, in another embodiment, the sensor area 24 may be provided in another corner of the second housing 52 or in any area between an upper corner and a lower corner. In an embodiment, components for performing various functions embedded in the electronic device 1 may be visually exposed on the front surface of the electronic device 1 through the sensor area 24 or one or more openings formed in the sensor area 24. In an embodiment, the components may include various types of sensors. The sensors may include, for example, at least one of a front camera, a receiver, or a proximity sensor.

In an embodiment, the first back cover 58 may be disposed on one side of the folding axis on the rear surface of the electronic device. In an embodiment, the first back cover 58 may have a substantially rectangular periphery, and the periphery may be surrounded by the first housing 51. Similarly, the second back cover 59 may be disposed on an opposite side of the folding axis on the rear surface of the electronic device, and the periphery may be surrounded by the second housing 52.

In the illustrated embodiment, the first back cover 58 and the second back cover 59 may have substantially symmetrical shapes with respect to the folding axis (the axis A). However, the first back cover 58 and the second back cover 59 do not necessarily have to have mutually symmetrical shapes. In another embodiment, the electronic device 1 may include the first back cover 58 and the second back cover 590 in various shapes. In another embodiment, the first back cover 58 may be integrally formed with the first housing 51, and/or the second back cover 59 may be integrally formed with the second housing 52.

In an embodiment, the first back cover 58, the second back cover 59, the first housing 51, and the second housing 52 may form a space in which various components (e.g., a printed circuit board or a battery) of the electronic device 1 are disposed. In an embodiment, one or more components may be disposed, or visually exposed, on the rear surface of the electronic device 1. For example, at least a portion of a sub-display 92 may be visually exposed through a first rear area 82 of the first back cover 58. In another embodiment, at least one sensor 94 may be visually exposed through a second rear area 84 of the second back cover 59. In an embodiment, the at least one sensor 94 may include a proximity sensor and/or a rear camera.

Referring to FIG. 2, in an embodiment, the hinge cover 53 may be disposed between the first housing 51 and the second housing 52 and may be configured to hide an internal component (e.g., a hinge structure). In an embodiment, depending on a state (a flat state or a folded state) of the electronic device 1, the hinge cover 53 may be hidden by a portion of the first housing 51 and a portion of the second housing 52, or may be exposed to the outside.

For example, when the electronic device 1 is in a flat state as illustrated in FIG. 1, the hinge cover 53 may be hidden by the first housing 51 and the second housing 52 and thus may not be exposed. For example, when the electronic device 1 is in a folded state (e.g., a fully folded state) as illustrated in FIG. 2, the hinge cover 53 may be exposed to the outside from between the first housing 51 and the second housing 52. For example, in an intermediate state in which the first housing 51 and the second housing 52 are folded with a certain angle, the hinge cover 53 may be partially exposed to the outside from between the first housing 51 and the second housing 52. However, in this case, the exposed area of the hinge cover 53 may be smaller than that in the fully folded state. In an embodiment, the hinge cover 53 may include a curved surface.

In an embodiment, the display 10 may be disposed in the space formed by the foldable housing 50. For example, the display 10 may be seated on the recess formed by the foldable housing 50 and may form most of the front surface of the electronic device 1.

In an embodiment, the front surface of the electronic device 1 may be formed by the display 10, the first housing 51, and the second housing 52. In an embodiment, the rear surface of the electronic device 1 may be formed by the first back cover 58, the first housing 51, the second back cover 59, and the second housing 52.

In an embodiment, the display 10 may refer to a display, at least a partial area of which is able to be deformed to be flat or curved. In an embodiment, the display 10 may include a folding area 13, a first area 11 disposed on one side with respect to the folding area 13 (on the left side of the folding area 13 illustrated in FIG. 1), and a second area 12 disposed on an opposite side with respect to the folding area 13 (on the right side of the folding area 13 illustrated in FIG. 1).

The division of the display 10 into the areas illustrated in FIG. 1 is illustrative, and the display 10 may be divided into a plurality of areas (e.g., four or more areas, or two areas) depending on the structure or function of the display 10. For example, in the embodiment illustrated in FIG. 1, the areas of the display may be divided from each other by the folding area 13 or the folding axis (the axis A) that extends parallel to the y-axis. However, in another embodiment, the display 10 may be divided into areas with respect to another folding area (e.g., a folding area parallel to the x-axis) or another folding axis (e.g., a folding axis parallel to the x-axis).

The first area 11 and the second area 12 may have entirely symmetrical shapes with respect to the folding area 13. However, unlike the first area 11, the second area 12 may include a notch that is cut depending on the presence of the sensor area 24, and in the other areas, the second area 12 may have a shape symmetrical to the shape of the first area 11. In other words, the first area 11 and the second area 12 may include portions having mutually symmetrical shapes and portions having mutually asymmetrical shapes.

Hereinafter, operations of the first housing 51 and the second housing 52 and the areas of the display 10 depending on states (e.g., a flat state and a folded state) of the electronic device 1 will be described.

In an embodiment, when the electronic device 1 is in a flat state (e.g., FIG. 1), the first housing 51 and the second housing 52 may be disposed to face the same direction while forming an angle of 180 degrees. A surface of the first area 11 and a surface of the second area 12 of the display 10 may face the same direction (e.g., the direction toward the front surface of the electronic device or the z-axis direction) while forming an angle of 180 degrees. The folding area 13 may form the same plane as the first area 11 and the second area 12. For example, in the flat state of the electronic device 1, the first area 11, the second area 12, and the folding area 13 may form one substantially flat surface together.

In an embodiment, when the electronic device 1 is in a folded state (e.g., FIG. 2), the first housing 51 and the second housing 52 may be disposed to at least partially face each other. The first housing 51 may rotate about a first rotational axis R1, and the second housing 52 may rotate about a second rotational axis R2. As the first housing 51 and the second housing 52 rotate, the electronic device 1 may be entirely folded about the folding axis A. The surface of the first area 11 and the surface of the second area 12 of the display 10 may face each other while forming a narrow angle (e.g., an angle between 0 degrees and 10 degrees). At least a portion of the folding area 13 may be curved to have a certain curvature.

In an embodiment, when the electronic device 1 is in an intermediate state (e.g., FIG. 2), the first housing 51 and the second housing 52 may be disposed at a certain angle. The surface of the first area 11 and the surface of the second area 12 of the display 10 may form an angle greater than that in the folded state and smaller than that in the flat state. At least a portion of the folding area 13 may be curved to have a certain curvature, and at this time, the curvature may be smaller than that in the folded state.

Figure 3:
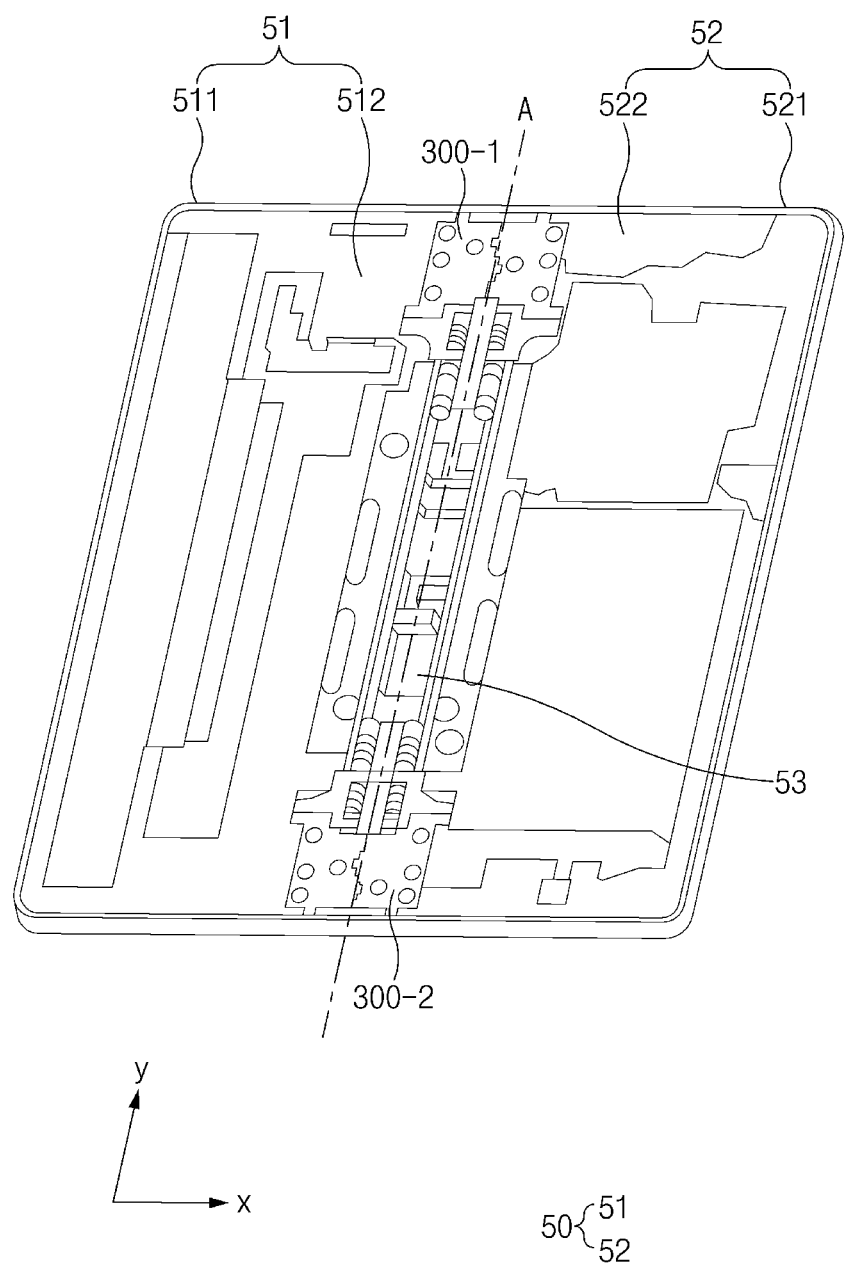
FIG. 3 illustrates the inside of the electronic device according to an example embodiment.

FIG. 3 illustrates the inside of the electronic device according to an embodiment.

Hereinafter, repetitive descriptions of components having the same reference numerals as the above-described components will be omitted.

Referring to FIG. 3, in an embodiment, the first housing 51 may include a first frame structure 511 and a first plate structure 512, and the second housing 52 may include a second frame structure 521 and a second plate structure 522. In an embodiment, the first frame structure 511 and the first plate structure 512 may form an exterior of the electronic device 1 (e.g., a side surface of the electronic device 1). In an embodiment, the first plate structure 512 may extend from the first frame structure 511 toward the inside of the electronic device 1. In an embodiment, the first plate structure 512 may be located inside the electronic device 1. In an embodiment, the first plate structure 512 may be formed separately from the first frame structure 511 and may be coupled with the first frame structure 511, or may be integrally formed with the first frame structure 511. Similarly, the second plate structure 522 may extend from the second frame structure 521 toward the inside of the electronic device 1. The second plate structure 522 may be located inside the electronic device 1. The second plate structure 522 may be formed separately from the second frame structure 521 and may be coupled, directly or indirectly, with the second frame structure 521, or may be integrally formed with the second frame structure 521.

The electronic device 1 according to an embodiment may include at least one hinge structure. For example, the electronic device 1 may include a first hinge structure 300-1 and a second hinge structure 300-2. In another example, one of the first hinge structure 300-1 and the second hinge structure 300-2 may be omitted, and the electronic device 1 may further include another hinge structure not illustrated.

In an embodiment, the hinge cover 53 may extend between the first housing 51 and the second housing 52 along the folding axis A (or, in the y-axis direction). The hinge cover 53 may form a space for accommodating the first hinge structure 300-1 and the second hinge structure 300-2.

In an embodiment, each of the first hinge structure 300-1 and the second hinge structure 300-2 may be disposed in the hinge cover 53. For example, the first hinge structure 300-1 may be disposed on one side of the hinge cover 53, and the second hinge structure 300-2 may be spaced apart from the first hinge structure 300-1 and may be disposed on an opposite side of the hinge cover 53. In an embodiment, the first hinge structure 300-1 and the second hinge structure 300-2 may be located to be symmetrical to each other with respect to the x-axis. However, the disclosure is not limited thereto.

In an embodiment, each of the first hinge structure 300-1 and the second hinge structure 300-2 may be connected, directly or indirectly, to the first housing 51 and the second housing 52. For example, each of the first hinge structure 300-1 and the second hinge structure 300-2 may be connected, directly or indirectly, to the first plate structure 512 and the second plate structure 522. In an embodiment, as the first hinge structure 300-1 and the second hinge structure 300-2 are folded or unfolded, the first housing 51 and the second housing 52 connected, directly or indirectly, with the first hinge structure 300-1 and the second hinge structure 300-2 may be folded or unfolded.

Figure 4:
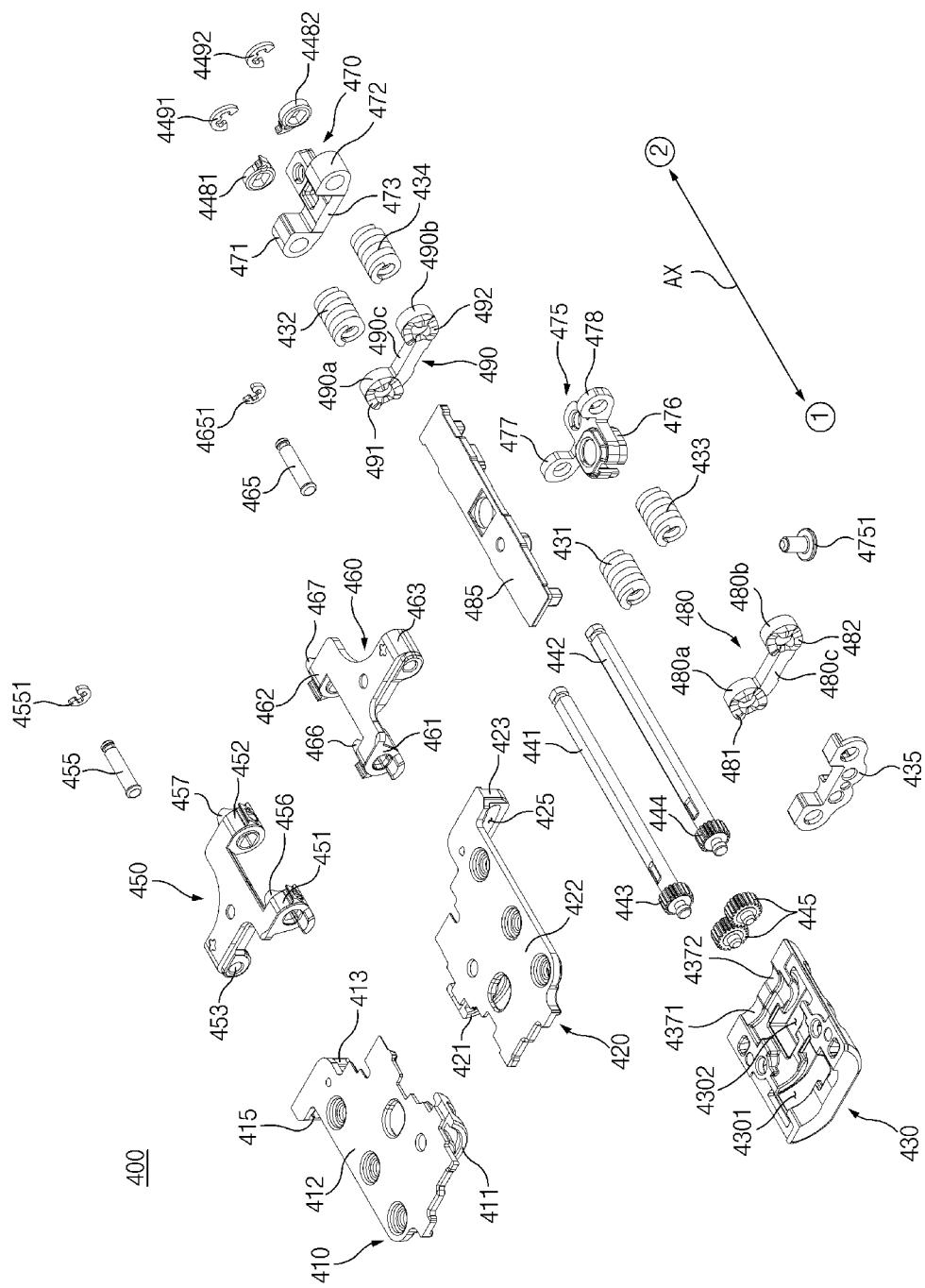
FIG. 4 is an exploded perspective view of a hinge structure according to an example embodiment.
Figure 5:
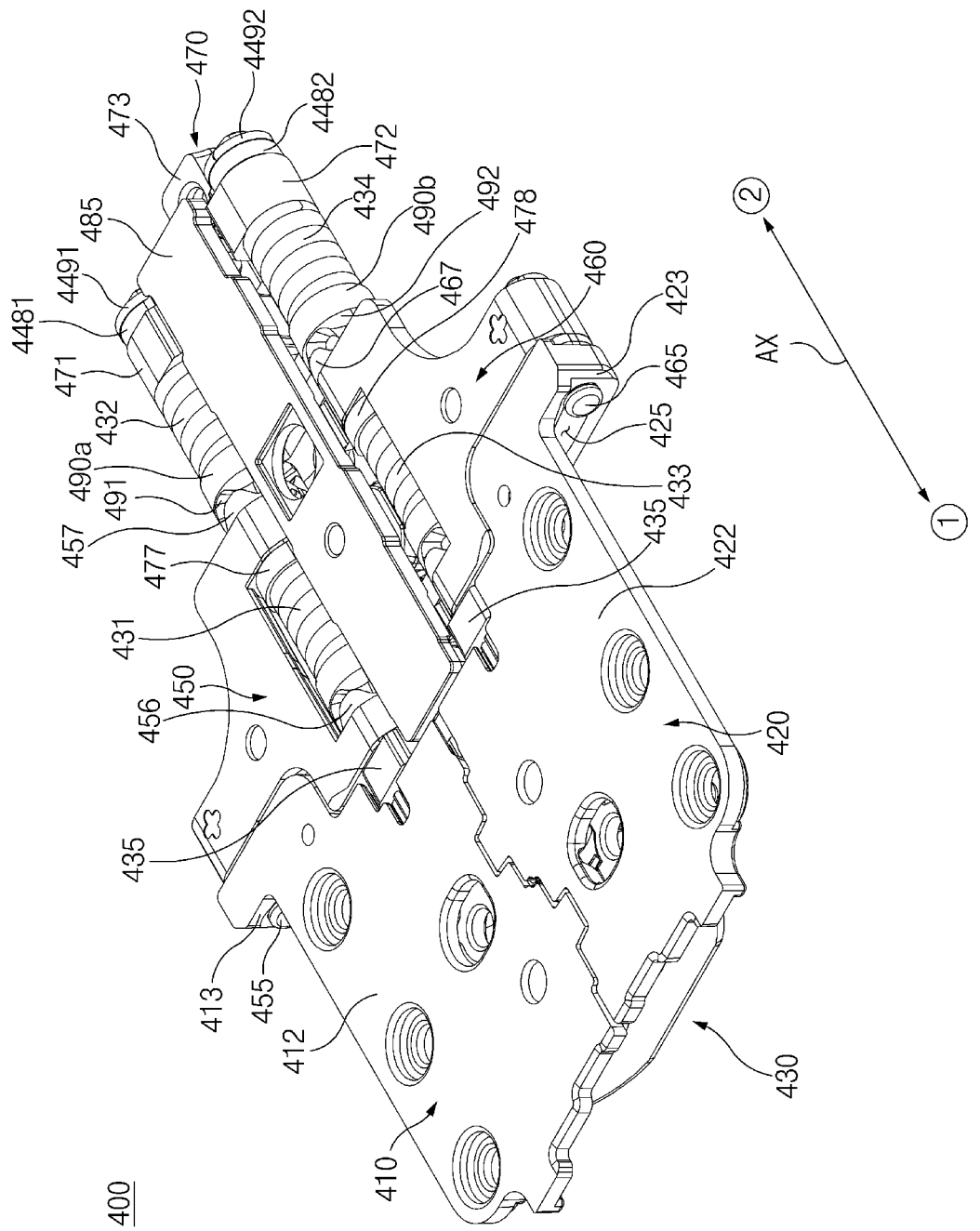
FIG. 5 is a front perspective view illustrating a flat state of the hinge structure according to an example embodiment.
Figure 6:
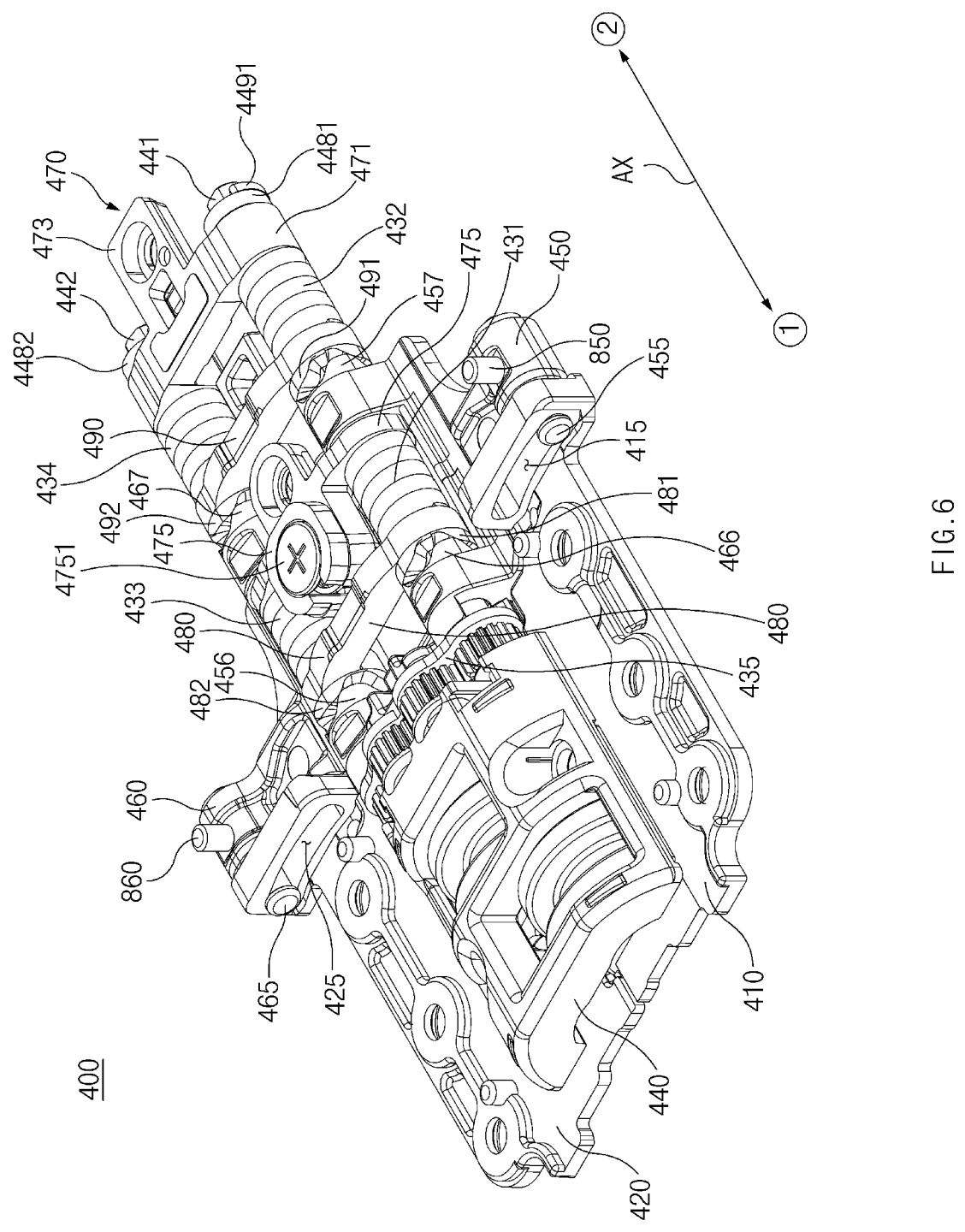
Figure 7:
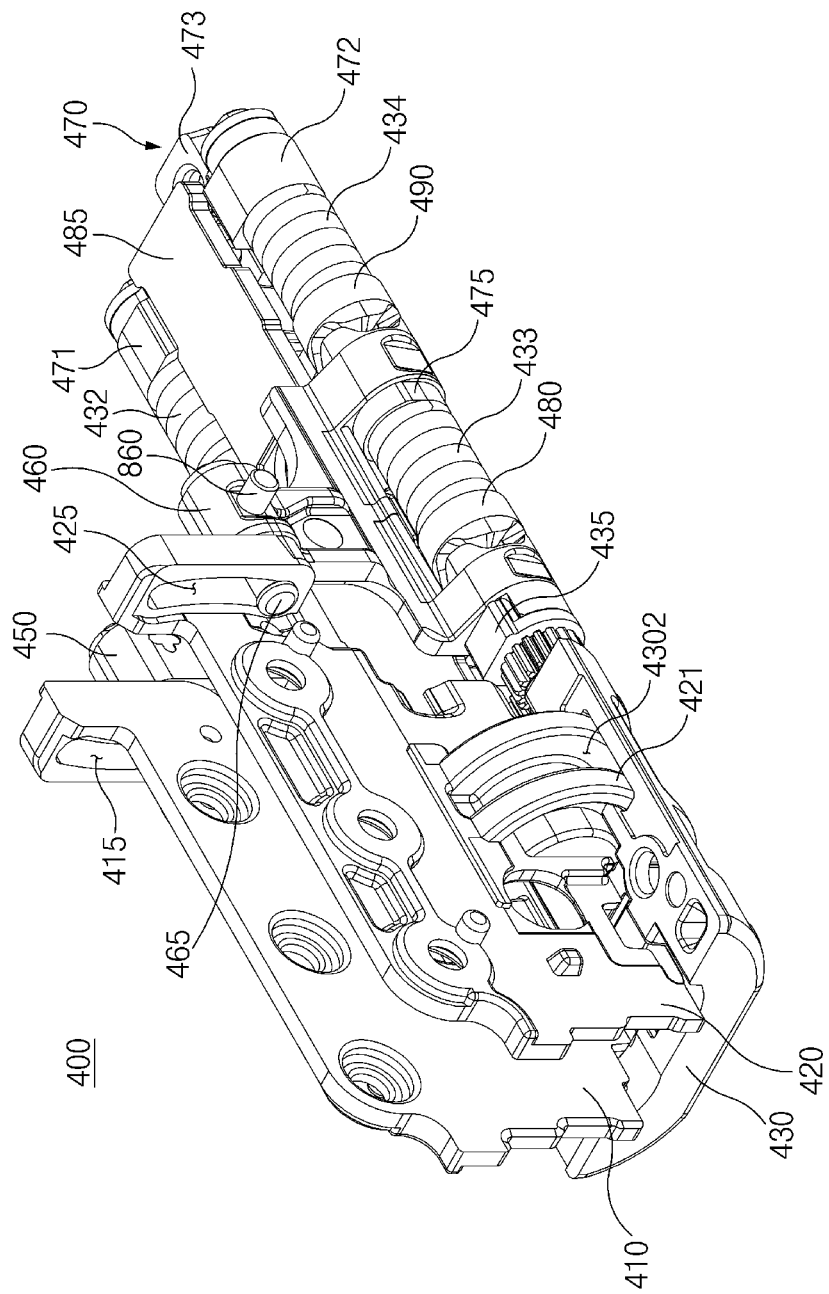
FIG. 7 is a perspective view illustrating a folded state of the hinge structure according to an example embodiment.

FIG. 4 is an exploded perspective view of a hinge structure according to an embodiment. FIG. 5 is a front perspective view illustrating a flat state of the hinge structure according to an embodiment. FIG. 6 is a back perspective view illustrating a flat state of the hinge structure according to an embodiment. FIG. 7 is a perspective view illustrating a folded state of the hinge structure according to an embodiment.

In FIGS. 4, 5, 6, and 7, an axial direction AX including a first direction ① and a second direction ② opposite to the first direction ① may be defined. The axial direction AX may be a direction substantially parallel to the direction in which the folding axis A of FIG. 3 extends. The axial direction AX may be a direction substantially parallel to the extension direction of the first rotational axis R1 and/or the second rotational axis R2 of FIG. 1. The axial direction AX may be a direction substantially parallel to the y-axis direction of FIG. 3. The first direction ① of the axial direction AX may be a direction toward the outside from a center inside the electronic device 1 of FIG. 3. The second direction ② of the axial direction AX may be a direction toward the center inside the electronic device 1 from outside the electronic device 1 of FIG. 3. The first direction ① of the axial direction AX may be a direction toward a hinge bracket 430 from a third support member 470 of the hinge structure 400, and the second direction ② of the axial direction AX may be a direction toward the third support member 470 from the hinge bracket 430 of the hinge structure 400.

Referring to FIGS. 4, 5, 6, and 7, the hinge structure 400 according to an embodiment (e.g., the first hinge structure 300-1 or the second hinge structure 300-2 of FIG. 3) may include the hinge bracket 430, a first shaft member 441, a second shaft member 442, a gear structure, a first support member 435, a second support member 475, the third support member 470, a center plate 485, and an arm structure.

In an embodiment, the hinge bracket 430 may be at least partially accommodated in a hinge cover (e.g., the hinge cover 53 of FIG. 3) and may be fixedly disposed in the hinge cover.

In an embodiment, a first rotation member 410 and a second rotation member 420 may be coupled, directly or indirectly, to the hinge bracket 430 so as to be rotatable.

In an embodiment, the hinge bracket 430 may include a first guide rail 4301 for guiding a rotational path of the first rotation member 410 and a second guide rail 4302 for guiding a rotational path of the second rotation member 420. In an embodiment, a first guide part 411 of the first rotation member 410 may be accommodated in the first guide rail 4301 of the hinge bracket 430. The first rotation member 410 may rotate while the first guide part 411 moves along a path provided by the first guide rail 4301. In an embodiment, a second guide part 421 of the second rotation member 420 may be accommodated in the second guide rail 4302 of the hinge bracket 430. The second rotation member 420 may rotate while the second guide part 421 moves along a path provided by the second guide rail 4302.

In an embodiment, the first shaft member 441 may extend in the axial direction AX. For example, the first shaft member 441 may extend from the hinge bracket 430 in the second direction ②. In an embodiment, the first shaft member 441 may be disposed in the hinge cover (e.g., the hinge cover 53 of FIG. 3).

In an embodiment, the first shaft member 441 may be coupled, directly or indirectly, to the hinge bracket 430 so as to be rotatable. For example, an end portion of the first shaft member 441 in the first direction ① may be rotatably disposed in a recess or opening 4371 formed in the hinge bracket 430. In an embodiment, a first fixing ring 4491 may be coupled, directly or indirectly, to an end portion of the first shaft member 441 that faces in the second direction ② and may prevent or reduce separation of the third support member 470 from the first shaft member 441.

In an embodiment, the hinge bracket 430, the first support member 435, a first part 451 of a first arm member 450, a first cam member 480, a first elastic member 431, the second support member 475, a second part 452 of the first arm member 450, a second cam member 490, a second elastic member 432, the third support member 470, a first stopping member 4481, and the first fixing ring 4491 may be coupled, directly or indirectly, to the first shaft member 441 in the order of the second direction ②.

In an embodiment, the second shaft member 442 may be spaced apart from the first shaft member 441 and may extend in the axial direction AX. For example, the second shaft member 442 may extend from the hinge bracket 430 in the second direction ②. In an embodiment, the second shaft member 442 may be disposed in the hinge cover.

In an embodiment, the second shaft member 442 may be coupled, directly or indirectly, to the hinge bracket 430 so as to be rotatable. For example, an end portion of the second shaft member 442 in the first direction ① may be rotatably disposed in a recess or opening 4372 formed in the hinge bracket 430. In an embodiment, a second fixing ring 4492 may be coupled, directly or indirectly, to an end portion of the second shaft member 442 that faces in the second direction ② and may prevent or reduce separation of the third support member 470 from the second shaft member 442.

In an embodiment, the hinge bracket 433, the first support member 435, a first part 461 of a second arm member 460, the first cam member 480, a third elastic member 433, the second support member 475, a second part 462 of the second arm member 460, the second cam member 490, a fourth elastic member 434, the third support member 470, a second stopping member 4482, and the second fixing ring 4492 may be coupled, directly or indirectly, to the second shaft member 442 in the order of the second direction ②.

In an embodiment, the gear structure may include a first gear 443, a second gear 444, and connecting gears 445. In an embodiment, the first gear 443 may be formed on an outer circumferential surface of one end portion (e.g., the end portion facing in the first direction ①) of the first shaft member 441. In an embodiment, the second gear 444 may be formed on an outer circumferential surface of one end portion (e.g., the end portion facing in the first direction ①) of the second shaft member 442. In an embodiment, the first gear 443 and the second gear 444 may at least partially face each other. In an embodiment, the connecting gears 445 may be located between the first gear 443 and the second gear 444 and may be engaged with the first gear 443 and the second gear 444. In an embodiment, the connecting gears 445 may be connected, directly or indirectly, to the hinge bracket 430 and the first support member 435 so as to be rotatable. For example, end portions of rotary shafts of the connecting gears 445 in the first direction ① may be rotatably seated on the hinge bracket 430, and end portions of the rotary shafts of the connecting gears 445 in the second direction ② may be rotatably accommodated in holes formed in the first support member 435. In an embodiment, rotation of the first shaft member 441 and rotation of the second shaft member 442 may be interlocked with each other through the gear structure. In an embodiment, the gear structure may be configured such that the first shaft member 441 and the second shaft member 442 are rotated by the same angle. In an embodiment, the gear structure may be configured such that the first shaft member 441 and the second shaft member 442 rotate in opposite directions. For example, an even number of connecting gears 445 engaged with the first gear 443 and the second gear 444 may be provided, and thus the first shaft member 441 and the second shaft member 442 may rotate in opposite directions. For example, when the first shaft member 441 rotates in the counterclockwise direction, the second shaft member 442 may rotate in the clockwise direction.

In an embodiment, the first support member 435 may include a plurality of through-holes through which the first shaft member 441 and the second shaft member 442 pass. In an embodiment, the first support member 435 may be located in the second direction ② with respect to the gear structure.

In an embodiment, the second support member 475 may include a first support part 476 located between the first shaft member 441 and the second shaft member 442, a first extending part 477 that extends from the first support part 476 and through which the first shaft member 441 passes, and a second extending part 478 that extends from the first support part 476 and through which the second shaft member 442 passes. In an embodiment, the first support part 476 may be fixedly disposed in the hinge cover. In an embodiment, the first extending part 477 may be located between the first part 451 and the second part 452 of the first arm member 450. The first extending part 477 may be adjacent to the second part 452 of the first arm member 450. In an embodiment, the second extending part 478 may be located between the first part 461 and the second part 462 of the second arm member 460. The second extending part 478 may be adjacent to the second part 462 of the second arm member 460.

In an embodiment, the third support member 470 may include a second support part 473 located between the first shaft member 441 and the second shaft member 442, a third extending part 471 that extends from the second support part 473 and through which the first shaft member 441 passes, and a fourth extending part 472 that extends from the second support part 473 and through which the second shaft member 442 passes. In an embodiment, the second support part 473 may be fixedly disposed in the hinge cover. In an embodiment, the second elastic member 432 may be located in the first direction ① with respect to the third extending part 471, and the first stopping member 4481 may be disposed in the second direction ② with respect to the third extending part 471. In an embodiment, the first stopping member 4481 may be penetrated by the first shaft member 441 and may rotate along with the rotation of the first shaft member 441. In an embodiment, the first stopping member 4481 may be penetrated by the first shaft member 441 and may rotate together with the first shaft member 441. The first stopping member 4481 may include a protrusion extending in a direction perpendicular to the axial direction AX. The protrusion of the first stopping member 4481 may be configured to be at least partially stopped by the second support part 473 and may limit the range of rotation of the first shaft member 441. In an embodiment, the fourth elastic member 434 may be located in the first direction ① with respect to the fourth extending part 472, and the second stopping member 4482 may be disposed in the second direction ② with respect to the fourth extending part 472. In an embodiment, the second stopping member 4482 may be penetrated by the second shaft member 442 and may rotate along with the rotation of the second shaft member 442. In an embodiment, the second stopping member 4482 may include a protrusion extending in a direction perpendicular to the axial direction AX. The protrusion of the second stopping member 4482 may be configured to be at least partially stopped by the second support part 473 and may limit the range of rotation of the second shaft member 442.

In an embodiment, the center plate 485 may extend in the axial direction AX. The center plate 485 may extend from the first support member 435 to the third support member 470 and may be seated on the first support member 435, the first support part 476 of the second support member 475, and the second support part 473 of the third support member 470. In an embodiment, the center plate 485 and the second support member 475 may be fastened to each other through a screw member 4751. In an embodiment, an upper surface of the center plate 485 may be formed to be substantially flat.

In an embodiment, the arm structure may include the first arm member 450, the second arm member 460, the first rotation member 410, and/or the second rotation member 420. In an embodiment, the arm structure may include a first protrusion 850 formed on the first arm member 450 and/or a second protrusion 860 formed on the second arm member 460.

In an embodiment, the arm structure may include a first arm structure and/or a second arm structure. For example, the first arm structure may include the first arm member 450 and/or the first rotation member 410, and the second arm structure may include the second arm member 460 and/or the second rotation member 420.

In an embodiment, the first rotation member 410 may be configured to rotate along a predetermined path relative to the hinge bracket 430 as a first housing (e.g., the first housing 51 of FIG. 3) (hereinafter, referred to as the first housing 51) rotates. In an embodiment, the first rotation member 410 may include a first extending part 412 and the first guide part 411. The first extending part 412 may be formed in a substantially plate shape and may be connected, directly or indirectly, to the first housing 51. The first guide part 411 may include a first portion protruding and extending from the first extending part 412 toward the hinge bracket 430 and a second portion protruding from the first portion in the axial direction AX. The first guide part 411 may be accommodated in the first guide rail 4301 of the hinge bracket 430. The first rotation member 410 may rotate along a rotational path provided through the first guide part 411 accommodated in the first guide rail 4301. The first rotation member 410 may rotate about a first rotational axis (e.g., the first rotational axis R1 of FIG. 1) (hereinafter, referred to as the first rotational axis R1) together with the first housing 51 when an electronic device (e.g., the electronic device 1 of FIG. 3) is folded or unfolded.

In an embodiment, the first rotation member 410 may include a first coupling part/coupler 413. The first coupling part 413 may extend from the first extending part 412 so as to be adjacent to the first arm member 450. A first sliding groove 415 may be formed on the inside of the first coupling part 413. A first sliding pin 455 may be accommodated in the first sliding groove 415, and thus the first rotation member 410 and the first arm member 450 may be connected, directly or indirectly, to slide relative to each other.

In an embodiment, the second rotation member 420 may be configured to rotate along a predetermined path relative to the hinge bracket 430 as a second housing (e.g., the second housing 52 of FIG. 3) (hereinafter, referred to as the second housing 52) rotates. In an embodiment, the second rotation member 420 may include a second extending part 422 and the second guide part 421. The second extending part 422 may be formed in a substantially plate shape and may be connected, directly or indirectly, to the second housing 52. The second guide part 421 may include a third portion protruding and extending from the second extending part 422 toward the hinge bracket 430 and a fourth portion protruding from the third portion in the axial direction AX. The second guide part 421 may be accommodated in the second guide rail 4302 of the hinge bracket 430. The second rotation member 420 may rotate along a rotational path provided through the second guide part 421 accommodated in the second guide rail 4302. The second rotation member 420 may rotate about a second rotational axis (e.g., the second rotational axis R2 of FIG. 1) (hereinafter, referred to as the second rotational axis R1) together with the second housing when the electronic device is folded or unfolded.

In an embodiment, the second rotation member 420 may include a second coupling part 423. The second coupling part 423 may extend from the second extending part 422 so as to be adjacent to the second arm member 460. A second sliding groove 425 may be formed on the inside of the second coupling part 423. A second sliding pin 465 may be accommodated in the second sliding groove 425, and thus the second rotation member 420 and the second arm member 460 may be connected, directly or indirectly, to slide relative to each other.

In an embodiment, the first arm member 450 may be coupled to the first shaft member 441 so as to rotate about the first shaft member 441. For example, the first shaft member 441 and the first arm member 450 may be connected in such a manner that the first part 451 and the second part 452 of the first arm member 450 are penetrated by the first shaft member 441. In an embodiment, the first arm member 450 may be constrained to rotation of the first shaft member 441 and may rotate together with the first shaft member 441.

In an embodiment, the first arm member 450 may be coupled to the first rotation member 410 so as to slide relative to the first rotation member 410. For example, the first arm member 450 may include the first sliding pin 455 that passes through a third part 453 and that is fixedly coupled to the first arm member 450. An end portion of the first sliding pin 455 in the first direction ① may be accommodated in the first sliding groove 415 of the first rotation member 410, and an end portion of the first sliding pin 455 in the second direction ② may protrude outward (e.g., in the second direction ②) from the third part 453 of the first arm member 450. A fixing ring 4551 may be coupled to the end portion of the first sliding pin 455 that faces in the second direction ② and may prevent or reduce separation of the first sliding pin 455. In an embodiment, the first arm member 450 and the first rotation member 410 may slide relative to each other through the first sliding pin 455 fixedly coupled to the first arm member 450 and connected, directly or indirectly, to the first rotation member 410 so as to move in the first sliding groove 415. For example, when the first rotation member 410 rotates about the first rotational axis R1, the first arm member 450 may rotate about the first shaft member 441 and may simultaneously slide relative to the first rotation member 410 in the state in which the first sliding pin 455 is accommodated in the first sliding groove 415.

In an embodiment, the second arm member 460 may be coupled to the second shaft member 442 so as to rotate about the second shaft member 442. For example, the second shaft member 442 and the second arm member 460 may be connected, directly or indirectly, in such a manner that the first part 461 and the second part 462 of the second arm member 460 are penetrated by the second shaft member 442. In an embodiment, the second arm member 460 may be constrained to rotation of the second shaft member 442 and may rotate together with the second shaft member 442.

In an embodiment, the second arm member 460 may be coupled to the second rotation member 420 so as to slide relative to the second rotation member 420. For example, the second arm member 460 may include the second sliding pin 465 that passes through a third part 463 and that is fixedly coupled to the second arm member 460. An end portion of the second sliding pin 465 in the first direction ① may be accommodated in the second sliding groove 425 of the second rotation member 420, and an end portion of the second sliding pin 465 in the second direction ② may protrude outward (e.g., in the second direction ②) from the third part 463 of the second arm member 460. A fixing ring 4651 may be coupled to the end portion of the second sliding pin 465 that faces in the second direction ② and may prevent or reduce separation of the second sliding pin 465. In an embodiment, the second arm member 460 and the second rotation member 420 may slide relative to each other through the second sliding pin 465 fixedly coupled to the second arm member 460 and connected to the second rotation member 420 so as to move in the second sliding groove 425. For example, when the second rotation member 420 rotates about the second rotational axis R2, the second arm member 460 may rotate about the second shaft member 442 and may simultaneously slide relative to the second rotation member 420 in the state in which the second sliding pin 465 is accommodated in the second sliding groove 425.

In an embodiment, the hinge structure 400 may include a torque structure for providing friction torques acting around the centers of the first shaft member 441 and the second shaft member 442. In an embodiment, the torque structure may include a first arm cam 456, a second arm cam 457, a third arm cam 466, a fourth arm cam 467, the first cam member 480, the second cam member 490, the second support member 475, the third support member 470, the first elastic member 431, the second elastic member 432, the third elastic member 433, and the fourth elastic member 434. In an embodiment, the first arm cam 456, the second arm cam 457, the third arm cam 466, the fourth arm cam 467, the first cam member 480, the second cam member 490, the second support member 475, the third support member 470, the first elastic member 431, the second elastic member 432, the third elastic member 433, and the fourth elastic member 434 may be mounted on and/or coupled to the first shaft member 441 and/or the second shaft member 442.

In an embodiment, the first arm cam 456 may be formed on the first arm member 450. For example, the first arm cam 456 may be formed on the first part 451 of the first arm member 450 that surrounds the first shaft member 441. For example, on the first part 451 of the first arm member 450, the first arm cam 456 may be formed on an area around the first shaft member 441. For example, the first arm cam 456 may be formed on an area of the first part 451 that faces the second part 452.

In an embodiment, the third arm cam 466 may be formed on the second arm member 460. For example, the third arm cam 466 may be formed on the first part 461 of the second arm member 460 that surrounds the second shaft member 442. For example, on the first part 461 of the second arm member 460, the third arm cam 466 may be formed on an area around the second shaft member 442. For example, the third arm cam 466 may be formed on an area of the first part 461 that faces the second part 462.

In an embodiment, the first cam member 480 may include a first part 480a through which the first shaft member 441 passes, a second part 480b through which the second shaft member 442 passes, and a connecting part 480c connecting the first part 480a and the second part 480b. A first cam 481 may be formed on the first part 480a, and a second cam 482 may be formed on the second part 480b.

In an embodiment, the first arm cam 456 may be engaged with the first cam 481 of the first cam member 480. For example, the first arm cam 456 may include first protrusions extending in the second direction ②, and the first cam 481 may include second protrusions that extend in the first direction ① and that are engaged with the first protrusions. As the first arm member 450 rotates, the first cam 481 may move relative to the first arm cam 456 in the axial direction AX. Displacement of the first cam 481 may vary depending on the heights and slopes of the protrusions formed on the first arm cam 456 and the first cam 481.

In an embodiment, the third arm cam 466 may be engaged with the second cam 482 of the first cam member 480. For example, the third arm cam 466 may include third protrusions extending in the second direction ②, and the second cam 482 may include fourth protrusions that extend in the first direction ① and that are engaged with the third protrusions. As the second arm member 460 rotates, the second cam 482 may move relative to the third arm cam 466 in the axial direction AX. Displacement of the second cam 482 may vary depending on the heights and slopes of the protrusions formed on the third arm cam 466 and the second cam 482.

In an embodiment, the first elastic member 431 and the third elastic member 433 may be disposed between the first cam member 480 and the second support member 475. In an embodiment, the first elastic member 431 may be disposed between the first part 480a of the first cam member 480 and the first extending part 477 of the second support member 475. In an embodiment, the third elastic member 433 may be disposed between the second part 480b of the first cam member 480 and the second extending part 478 of the second support member 475. In an embodiment, the first elastic member 431 and the third elastic member 433 may be coupled to the first shaft member 441 and the second shaft member 442, respectively. For example, the first elastic member 431 and the third elastic member 433 may include spring structures that surround the first shaft member 441 and the second shaft member 442, respectively.

In an embodiment, while the first arm member 450 and the second arm member 460 rotate, the first cam member 480 may move in the axial direction AX through the cam structures engaged with each other. In an embodiment, as the first cam member 480 moves in the axial direction AX, the first elastic member 431 and the third elastic member 433 may be compressed or uncompressed. For example, when the first cam member 480 moves in the second direction ②, the first elastic member 431 and the third elastic member 433 may be compressed, and when the first cam member 480 moves in the first direction ①, the first elastic member 431 and the third elastic member 433 may be uncompressed. The first elastic member 431 and the third elastic member 433 may provide elastic forces to the first cam member 480 while being compressed or uncompressed. The frictional force between the first arm cam 456 and the first cam 481 and the frictional force between the third arm cam 466 and the second cam 482 may be increased by the elastic forces. Accordingly, the friction torques acting around the first shaft member 441 and the second shaft member 442 may be increased.

In an embodiment, the second arm cam 457 may be formed on the first arm member 450. For example, the second arm cam 457 may be formed on the second part 452 of the first arm member 450 that surrounds the first shaft member 441. For example, on the second part 452 of the first arm member 450, the second arm cam 457 may be formed on an area around the first shaft member 441. For example, the second arm cam 457 may protrude and extend from the second part 452 in the second direction ②.

In an embodiment, the fourth arm cam 467 may be formed on the second arm member 460. For example, the fourth arm cam 467 may be formed on the second part 462 of the second arm member 460 that surrounds the second shaft member 442. For example, on the second part 462 of the second arm member 460, the fourth arm cam 467 may be formed on an area around the second shaft member 442. For example, the fourth arm cam 467 may protrude and extend from the second part 462 in the second direction ②.

In an embodiment, the second cam member 490 may include a first part 490a through which the first shaft member 441 passes, a second part 490b through which the second shaft member 442 passes, and a connecting part 490c connecting the first part 490a and the second part 490b. A third cam 491 may be formed on the first part 490a, and a fourth cam 492 may be formed on the second part 490b.

In an embodiment, the second arm cam 457 may be engaged with the third cam 491 of the second cam member 490. For example, the second arm cam 457 may include fifth protrusions extending in the second direction ②, and the third cam 491 may include sixth protrusions that extend in the first direction ① and that are engaged with the fifth protrusions. As the first arm member 450 rotates, the third cam 491 may move relative to the second arm cam 457 in the axial direction AX. Displacement of the third cam 491 may vary depending on the heights and slopes of the protrusions formed on the second arm cam 457 and the third cam 491.

In an embodiment, the fourth arm cam 467 may be engaged with the fourth cam 492 of the second cam member 490. For example, the fourth arm cam 467 may include seventh protrusions extending in the second direction ②, and the fourth cam 492 may include eighth protrusions that extend in the first direction ① and that are engaged with the seventh protrusions. As the second arm member 460 rotates, the fourth cam 492 may move relative to the fourth arm cam 467 in the axial direction AX. Displacement of the fourth cam 492 may vary depending on the heights and slopes of the protrusions formed on the fourth arm cam 467 and the fourth cam 492.

In an embodiment, the second elastic member 432 and the fourth elastic member 434 may be disposed between the second cam member 490 and the third support member 470. In an embodiment, the second elastic member 432 may be disposed between the first part 490a of the second cam member 490 and the third extending part 471 of the third support member 470. In an embodiment, the fourth elastic member 434 may be disposed between the second part 490b of the second cam member 490 and the fourth extending part 472 of the third support member 470. In an embodiment, the second elastic member 432 and the fourth elastic member 433 may be coupled to the first shaft member 441 and the second shaft member 442, respectively. For example, the second elastic member 432 and the fourth elastic member 434 may include spring structures that surround the first shaft member 441 and the second shaft member 442, respectively.

In an embodiment, while the first arm member 450 and the second arm member 460 rotate, the second cam member 490 may move in the axial direction AX through the cam structures engaged with each other. In an embodiment, as the second cam member 490 moves in the axial direction AX, the second elastic member 432 and the fourth elastic member 434 may be compressed or uncompressed. For example, when the second cam member 490 moves in the second direction ②, the second elastic member 432 and the fourth elastic member 434 may be compressed, and when the second cam member 490 moves in the first direction ①, the second elastic member 432 and the fourth elastic member 434 may be uncompressed. The second elastic member 432 and the fourth elastic member 434 may provide elastic forces to the second cam member 490 while being compressed or uncompressed. The frictional force between the second arm cam 457 and the third cam 491 and the frictional force between the fourth arm cam 467 and the fourth cam 492 may be increased by the elastic forces. Accordingly, the friction torques acting around the first shaft member 441 and the second shaft member 442 may be increased.

In another embodiment, the first arm member 450 and the second arm member 460 may rotate independently of rotation of the first shaft member 441 and the second shaft member 442. For example, the first shaft member 441 and the second shaft member 442 may be fixedly disposed in the hinge cover (e.g., the hinge cover 53 of FIG. 2) and thus may not be rotatable, and the first arm member 450 and the second arm member 460 may be connected so as to be rotatable relative to the first shaft member 441 and the second shaft member 442. In this case, the hinge structure 400 may include a gear structure for interlocking rotation of the first arm member 450 and rotation of the second arm member 460. For example, unlike those illustrated, the first gear 443 may be formed on an outer circumferential surface of the first part 451 of the first arm member 450, and the second gear 444 may be formed on an outer circumferential surface of the first part 461 of the second arm member 460. The connecting gears 445 may be disposed between the first arm member 450 and the second arm member 460 so as to be engaged with the first gear 443 and the second gear 444. The rotation of the first arm member 450 and the rotation of the second arm member 460 may be interlocked with each other irrespective of rotation of the first shaft member 441 and the second shaft member 442.

Figure 8A:
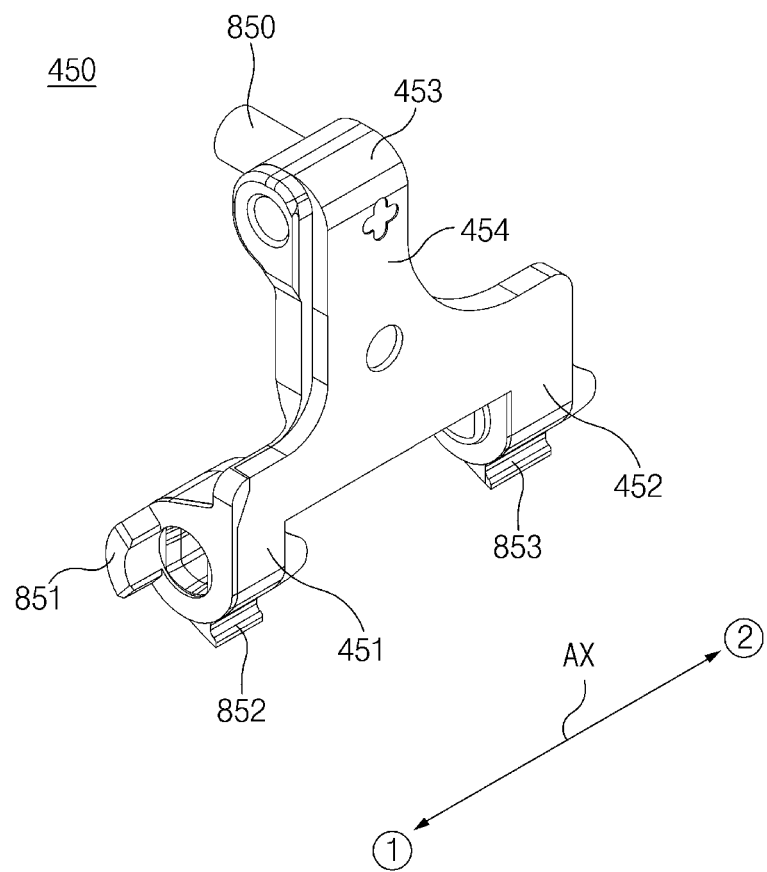
FIG. 8A is a perspective view of a first arm member according to an embodiment as viewed in one direction.

FIG. 8A is a perspective view of the first arm member according to an embodiment as viewed in one direction.

Figure 8B:
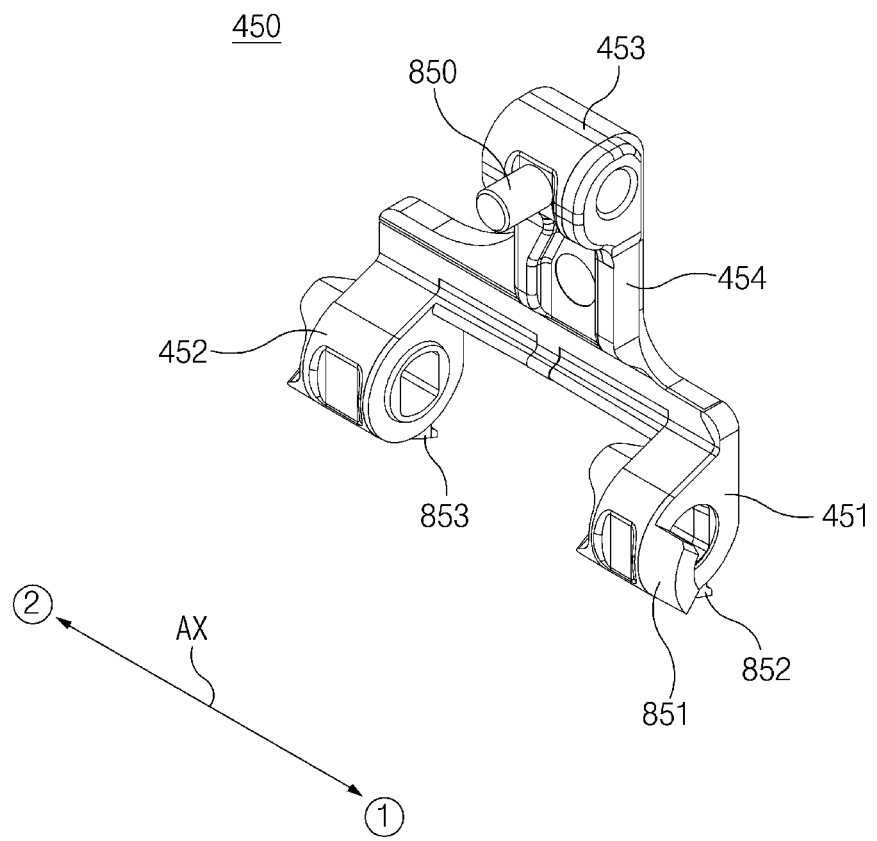
FIG. 8B is a perspective view of the first arm member according to an example embodiment as viewed in one direction.

FIG. 8B is a perspective view of the first arm member according to an embodiment as viewed in one direction.

Referring to FIGS. 8A and 8B, the first arm member 450 may include an extending part 454, the first protrusion 850, a first stopping part 851, a second stopping part 852, and a third stopping part 853.

In an embodiment, the extending part 454 may be located between the first part 451, the second part 452, and the third part 453. In an embodiment, the first part 451 may be formed on an end portion of the extending part 454 that faces in the first direction ①, and the second part 452 may be formed on an end portion of the extending part 454 that faces in the second direction ②. In an embodiment, empty spaces through which the first shaft member (e.g., the first shaft member 441 of FIG. 4) passes may be formed in the first part 451 and the second part 452. The empty spaces formed in the first part 451 and the second part 452 may be arranged in the axial direction AX. In an embodiment, the cross-section of the first shaft member 441 may have a shape (e.g., a polygonal shape) having two different diameters, and the empty spaces formed in the first part 451 and the second part 452 may be formed to correspond to the cross-sectional shape of the first shaft member 441. Accordingly, the first arm member 450 may be constrained to rotation of the first shaft member 441. However, a method by which the first arm member 450 is constrained to rotation of the first shaft member 441 is not limited by the above-described example.

In an embodiment, the third part 453 may be formed on an end portion of the extending part 454 that faces in a direction perpendicular to the axial direction AX. The third part 453 may have an empty space formed therein into which a sliding pin (e.g., the first sliding pin 455 of FIG. 4) is inserted.

In an embodiment, the first protrusion 850 may protrude and extend from the third part 453 in a direction substantially perpendicular to the axial direction AX. For example, the first protrusion 850 may protrude and extend from the third part 453 toward the first housing 51. In an embodiment, the first protrusion 850 may extend in a substantially pillar shape. The first protrusion 850 may have a circular cross-section, but is not limited thereto. Modified embodiments of the first protrusion 850 will be described below with reference to FIG. 12.

In an embodiment, the first stopping part 851 may extend from the first part 451. For example, the first stopping part 851 may extend from the first part 451 in the first direction ①. In an embodiment, the second stopping part 852 may extend from the first part 451 and may be spaced apart from the first stopping part 851. For example, the second stopping part 852 may extend from the first part 451 in a direction perpendicular to the axial direction AX. In an embodiment, the first stopping part 851 and the second stopping part 852 may be configured to be stopped by another component (e.g., the first support member 435 of FIG. 4) when the first arm member 450 rotates and may limit the range of rotation of the first arm member 450.

In an embodiment, the third stopping part 853 may extend from the second part 452. For example, the third stopping part 853 may extend in a direction perpendicular to the axial direction AX. The third stopping part 853 may be configured to be stopped by another component (e.g., the first support part 476 of the second support member 475 of FIG. 4) when the first arm member 450 rotates and may limit the range of rotation of the first arm member 450.

The above description of the first arm member 450 may be substantially identically, similarly, or correspondingly applied to the second arm member (e.g., the second arm member 460 of FIG. 4). For example, a second protrusion (e.g., the second protrusion 860 of FIG. 6) corresponding to the first protrusion 850 may be formed on the third part 463 of the second arm member 460.

Figure 9:
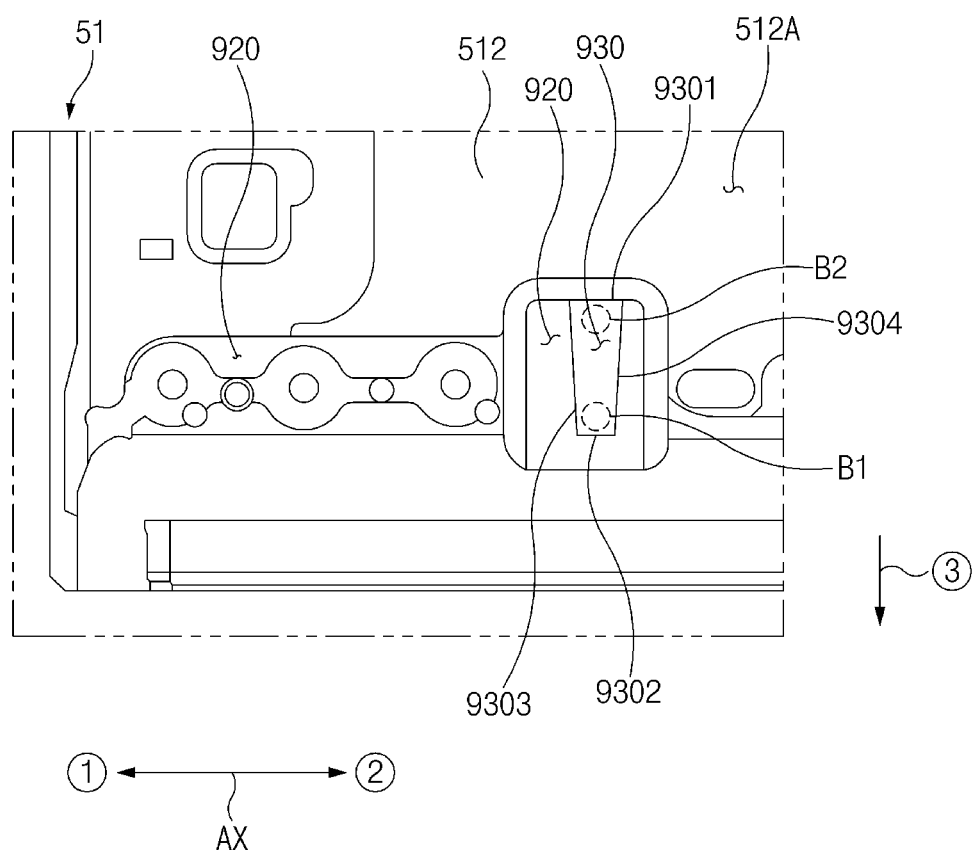
FIG. 9 illustrates a first housing according to an example embodiment.

FIG. 9 illustrates the first housing according to an embodiment.

Figure 10:
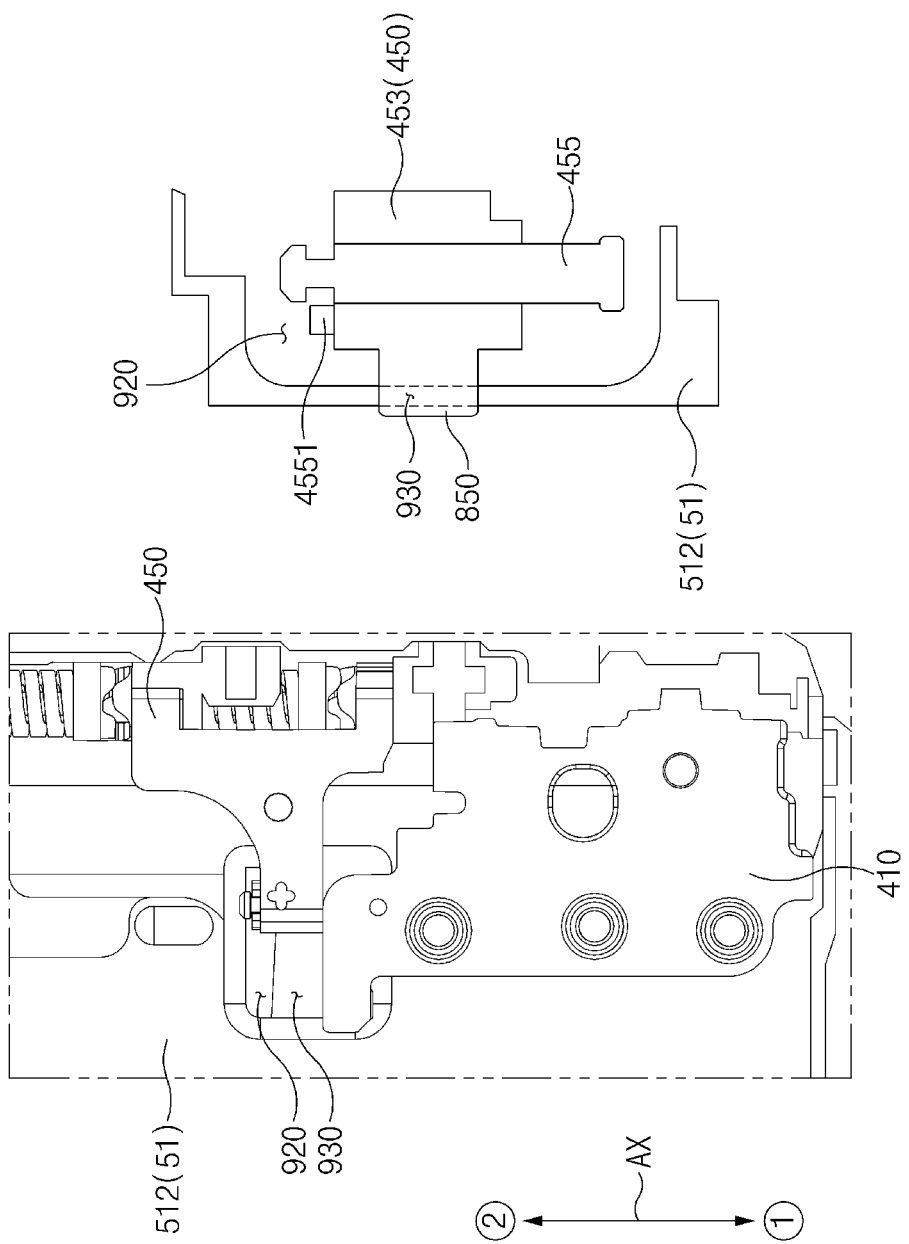
FIG. 10 illustrates the hinge structure and the first housing according to an example embodiment.

FIG. 10 illustrates the hinge structure and the first housing according to an embodiment.

Figure 11:
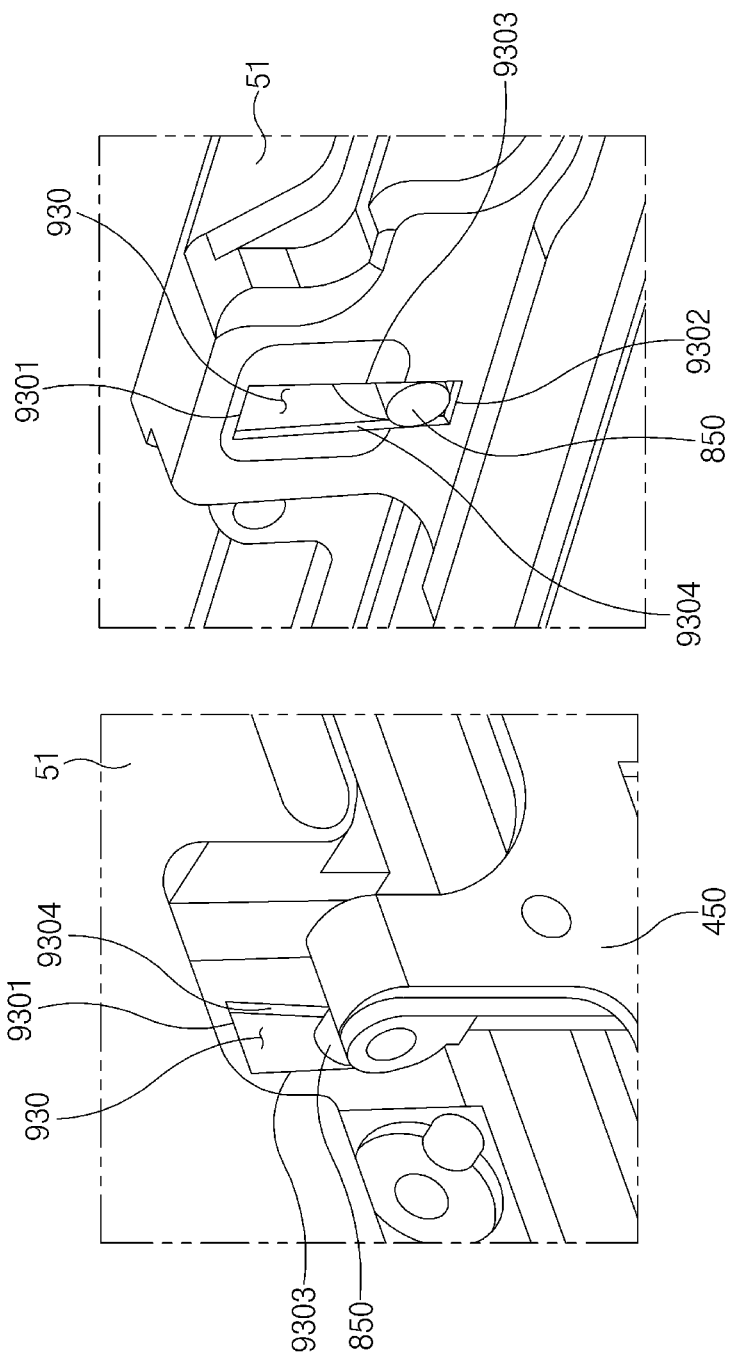
FIG. 11 illustrates the first arm member and the first housing according to an example embodiment.

FIG. 11 illustrates the first arm member and the first housing according to an embodiment.

Referring to FIGS. 9, 10, and 11, the first housing 51 according to an embodiment may include a recess 920 and a first guide hole 930 that are formed in the first plate structure 512.

In an embodiment, the recess 920 may be concavely formed on an upper surface 512A of the first plate structure 512. The first rotation member 410 and the first arm member 450 may be disposed on the first plate structure 512 so as to be at least partially accommodated in the recess 920. In an embodiment, the first rotation member 410 may be fixedly disposed on the first plate structure 512, and the first arm member 450 may be accommodated in the recess 920 and may be connected to the first plate structure 512 so as to slide. In an embodiment, when the first rotation member 410 and the first arm member 450 are accommodated in the recess 920, the first rotation member 410 and the first arm member 450 may be disposed such that upper surfaces thereof are located at substantially the same height as the upper surface 512A of the first plate structure 512 and may maintain the flatness of a display (e.g., the display 10 of FIG. 1) disposed on the first plate structure 512.

In an embodiment, the first guide hole 930 may be formed in the recess 920. In an embodiment, the first guide hole 930 may extend in a direction substantially perpendicular to the axial direction AX. In an embodiment, the first guide hole 930 may extend in a direction away from the hinge structure 400. In an embodiment, the first guide hole 930 may include a first edge 9301, a second edge 9302 facing the first edge 9301, a third edge 9303 extending from one end of the first edge 9301 to one end of the second edge 9302, and a fourth edge 9304 facing the third edge 9303 and extending from an opposite end of the first edge 9301 to an opposite end of the second edge 9302.

In an embodiment, the first guide hole 930 may be formed through the first plate structure 512. According to another embodiment, the first guide hole 930 may be recessed without penetrating the first plate structure 512.

As illustrated in FIG. 9, the first edge 9301 and the second edge 9302 may be substantially parallel to each other, and the length of the second edge 9302 may be shorter than the length of the first edge 9301. The center of the first edge 9301 and the center of the second edge 9302 may be aligned to match a direction perpendicular to the axial direction AX. The third edge 9303 and the fourth edge 9304 may obliquely extend based on the direction perpendicular to the axial direction AX. The first guide hole 930 may have a decreasing width toward the hinge structure 400 (e.g., in a third direction ③). However, the shape of the first guide hole 930 is not limited to the above-described example. Modified embodiments of the first guide hole 930 will be described below with reference to FIG. 12.

As illustrated in FIGS. 10 and 11, the first protrusion 850 of the first arm member 450 may be accommodated in the first guide hole 920 according to an embodiment. When the first arm member 450 rotates, the first protrusion 850 may slide within the first guide hole 930. For example, referring to FIG. 9, when the electronic device is in a folded state (e.g., the electronic device 1 of FIG. 2), the first protrusion 850 may be located at a first position B1 that is closer to the second edge 9302 than to the first edge 9301 of the first guide hole 930. For example, when the electronic device is in a flat state (e.g., the electronic device 1 of FIG. 1), the first protrusion 850 may be located at a second position B2 that is closer to the first edge 9301 than to the second edge 9302 of the first guide hole 930. In an embodiment, as the first arm member 450 rotates, the first protrusion 850 may linearly move in the first guide hole 930 in the direction perpendicular to the axial direction AX. For example, when the electronic device is unfolded in the folded state, the first protrusion 850 may move from the first position B1 to the second position B2. Detailed description thereabout will be given below with reference to FIGS. 13 to 15.

In an embodiment, the first protrusion 850 may be at least partially brought into contact with the third edge 9303 and/or the fourth edge 9304 of the first guide hole 930 while moving in the first guide hole 930. For example, when the first protrusion 850 is located at the first position B1, the first protrusion 850 may at least partially make contact with the third edge 9303 and the fourth edge 9304. In an embodiment, the first protrusion 850 brought into contact with the third edge 9303 and the fourth edge 9304 may prevent or reduce a chance of the first housing 51 form moving in the axial direction AX. For example, when an external force is applied to the first housing 51 in the second direction ②, the first housing 51 may move in the second direction ② in which the external force is applied, and the second housing 52 on the opposite side to the first housing 51 may slip in the first direction ① opposite to the second direction ②. Due to the movement of the first housing 51 and the second housing, not only the first housing 51, the second housing, and the hinge structure 400 but also the display disposed thereon may be damaged. The first protrusion 850 accommodated in the first guide hole 930 according to an embodiment may decrease the above-described movement between the housings, thereby reducing damage to the components due to the movement between the housings.

In an embodiment, when the first protrusion 850 has a circular cross-section, the diameter of the first protrusion 850 may be substantially the same as, or smaller than, the minimum width of the first guide hole 930. For example, as illustrated, the diameter of the first protrusion 850 may be substantially the same as the length of the second edge 9302.

In an embodiment, the first guide hole 930 may include a portion having a width greater than the diameter of the first protrusion 850 because a user may be inconvenient to fold and unfold the electronic device due to the frictional force acting between the first guide hole 930 and the first protrusion 850. For example, the length of the first edge 9301 may be greater than the diameter of the first protrusion 850. In this case, the first protrusion 850 may not be brought into contact with the third edge 9303 and the fourth edge 9304 when the first protrusion 850 is located at the second position B2 adjacent to the first edge 9301. However, the disclosure is not limited thereto as in the description provided with reference to FIG. 12 to be described below.

The descriptions of the first arm member 450, the first protrusion 850, the first rotation member 410, and the first housing 51 that have been provided with reference to FIGS. 9 to 11 may be substantially identically, similarly, or correspondingly applied to the second arm member 460, the second protrusion 860, the second rotation member 420, and the second housing 52. For example, the second protrusion 860 formed on the second arm member 460 may be accommodated in a second guide hole (e.g., a second guide hole 940 of FIG. 15) formed in the second plate structure 522 of the second housing 52 and may move in the second guide hole depending on a folding or unfolding operation of the electronic device.

Figure 12:
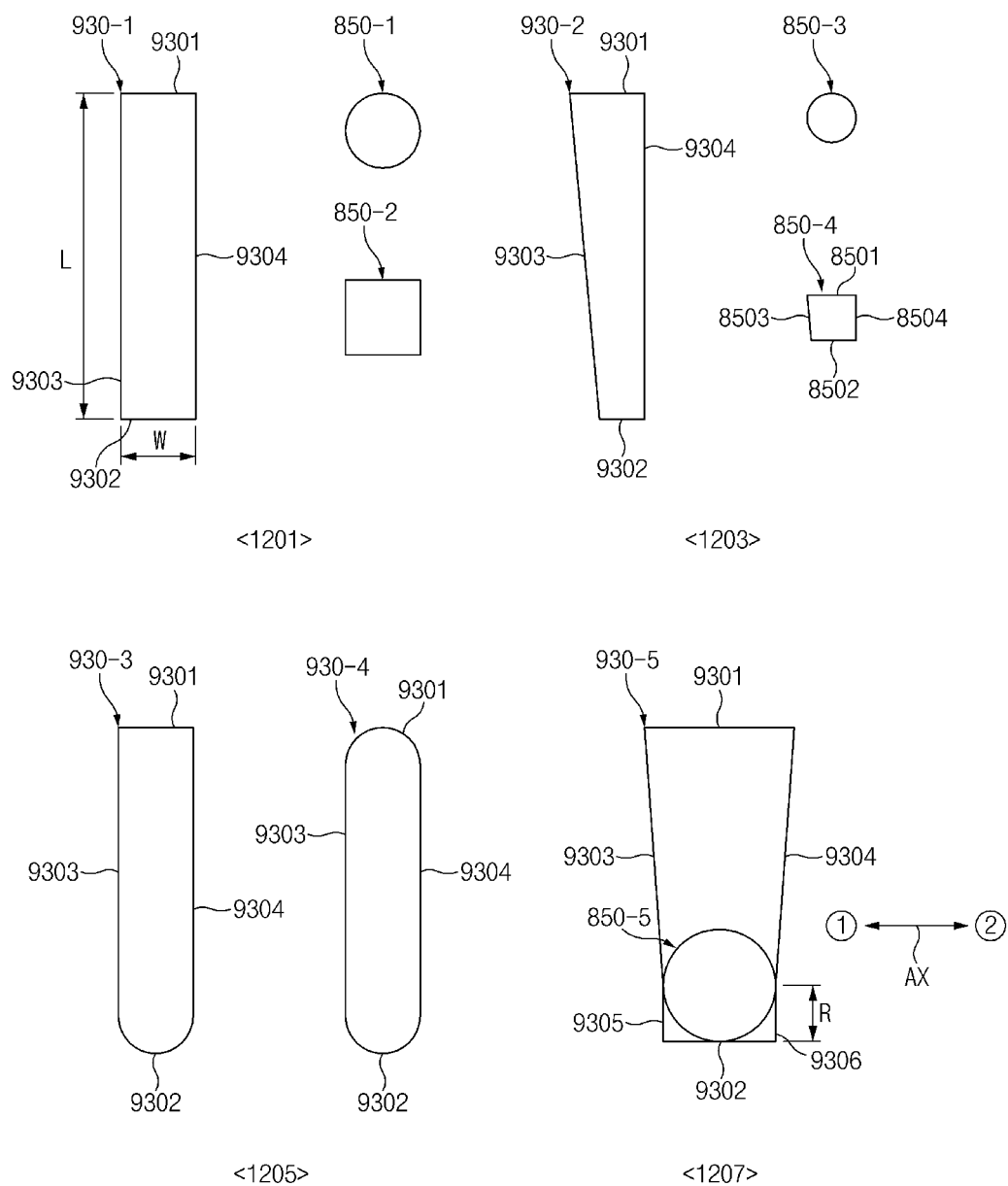
FIG. 12 illustrates the shapes of guide holes and first protrusions according to example embodiments.

FIG. 12 illustrates the shapes of guide holes and first protrusions according to embodiments.

Referring to reference numeral 1201 of FIG. 12, in an embodiment, a first guide hole 930-1 may be formed in a rectangular shape. The width W of the first guide hole 930-1 may be smaller than the length L of the first guide hole 930-1. The width W of the first guide hole 930-1 may be substantially constant. A first edge 9301 of the first guide hole 930-1 may have substantially the same length as a second edge 9302 of the first guide hole 930-1. A third edge 9303 and a fourth edge 9304 of the first guide hole 930-1 may be substantially parallel to each other. In an embodiment, a first protrusion 850-1 may include a circular cross-section having a diameter substantially the same as, or smaller than, the width W of the first guide hole 930-1. In another embodiment, a first protrusion 850-2 may include a rectangular cross-section having a width substantially the same as, or smaller than, the width of the first guide hole 930-1. In this case, the first protrusion 850-2 may make surface-to-surface contact with the third edge 9303 and/or the fourth edge 9304 of the first guide hole 930-1, thereby more effectively preventing or reducing movement of the housings than the first protrusion 850-1. The contact area with the first guide hole 930-1 may be increased as the length of an edge of the first protrusion 850-2 that faces the third edge 9303 and/or the fourth edge 9304 of the first guide hole 930-1 (or, the length of the first protrusion 850-2) is increased.

Referring to reference numeral 1203 of FIG. 12, a first guide hole 930-2 may be formed in a quadrangular shape rather than a rectangular shape. A second edge 9302 of the first guide hole 930-2 may be formed to be shorter than a first edge 9301, and the first guide hole 930-2 may have a gradually decreasing width W. The first edge 9301 and the second edge 9302 of the first guide hole 930-2 may be substantially parallel to each other. A fourth edge 9304 of the first guide hole 930-2 may be substantially perpendicular to the first edge 9301 and the second edge 9302. A third edge 9303 of the first guide hole 930-2 may not be parallel to the fourth edge 9304. In an embodiment, a first protrusion 850-3 may have a circular cross-section having a diameter substantially the same as, or smaller than, the length of the second edge 9302. In another embodiment, a first protrusion 850-4 may have a quadrangular cross-section rather than a rectangular cross-section. In this case, the first protrusion 850-4 may be accommodated in the first guide hole 930-2 and may be movable in the first guide hole 930-2. For example, the first protrusion 850-4 may include edges 8501 to 8504 that face the first to fourth edges 9301 to 9304 of the first guide hole 930-2, respectively, in the state in which the first protrusion 850-4 is accommodated in the first guide hole 930-2. The edge 8502 of the first protrusion 850-4 may have a length substantially the same as, or shorter than, the length of the second edge 9302 of the first guide hole 930-2. The edge 8503 of the first protrusion 850-4 may be substantially parallel to the third edge 9303 of the first guide hole 930-2. The edge 8504 of the first protrusion 850-4 may be substantially parallel to the fourth edge 9304 of the first guide hole 930-2. The edge 8501 of the first protrusion 850-4 may be substantially parallel to the second edge 9302 of the first guide hole 930-2. The edge 8501 of the first protrusion 850-4 may be longer than the edge 8502 and may be shorter than the first edge 9301 of the first guide hole 930-2.

Referring to reference numeral 1205 of FIG. 12, as in first guide holes 930-3 and 930-4 illustrated, a first edge 9301 and/or a second edge 9302 may include a curved surface. In this case, similarly to the above-described embodiments, a first protrusion may be formed in various shapes, for example, a circular shape, a rectangular shape, or a polygonal shape including a curved surface corresponding to the first guide holes 930-3 and 930-4 such that the first protrusion is accommodated in the first guide holes 930-3 and 930-4 and movable in the first guide holes 930-3 and 930-4.

Referring to reference numeral 1207 of FIG. 12, a first guide hole 930-5 may include portions extending substantially perpendicular to the axial direction AX and portions obliquely extending based on the axial direction AX. For example, a fifth edge 9305 and a sixth edge 9306 of the first guide hole 930-5 may extend substantially perpendicular to the axial direction AX, and a third edge 9303 and a fourth edge 9304 of the first guide hole 930-5 may obliquely extend based on the axial direction AX. In an embodiment, the third edge 9303 and the fourth edge 9304 may become closer to each other as the distance from a first edge 9301 increases. The fifth edge 9305 and the sixth edge 9306 may be substantially parallel to each other. In an embodiment, the length of the fifth edge 9305 and/or the length of the sixth edge 9306 may be substantially the same as, or greater than, the radius R of a first protrusion 850-5 accommodated in the first guide hole 930-5.

The shapes of the first guide hole 930 and the first protrusion 850 described above are not limited by the illustrated embodiments, and various design changes may be possible. For example, non-illustrated embodiments applicable by those skilled in the art or combinations of the illustrated embodiments may be possible.

The description provided with reference to FIG. 12 may be substantially identically, similarly, or correspondingly applied to the second guide hole 940 formed in the second plate structure 522 and the second protrusion 860 formed on the second arm member 560.

Figure 13:
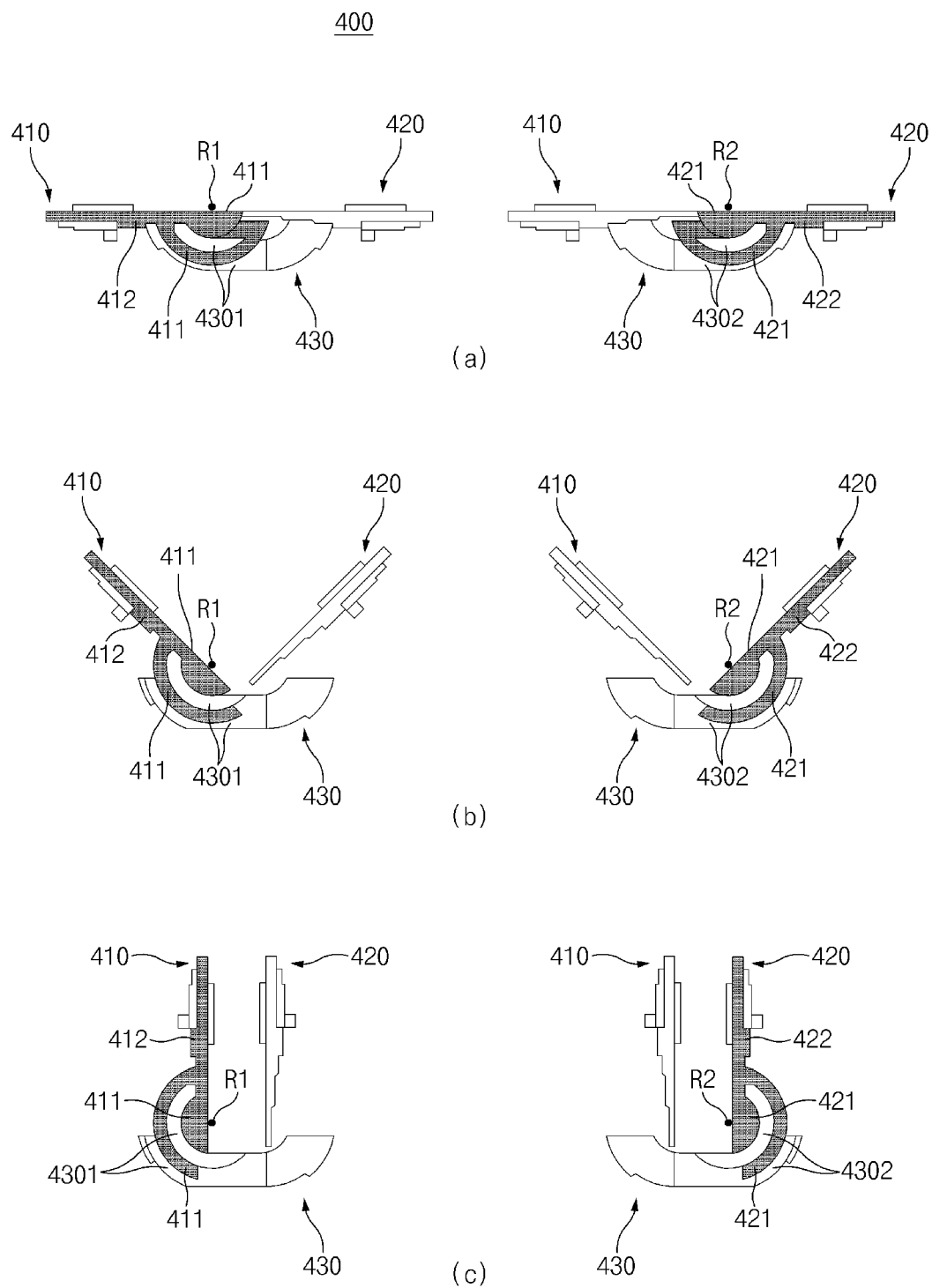
FIG. 13 is a view illustrating a rotation operation of rotation members of the hinge structure according to an example embodiment.

FIG. 13 is a view illustrating a rotation operation of rotation members of the hinge structure according to an embodiment. FIG. 13 may correspond to line A-A' of FIG. 6.

FIG. 13 (a) is a view illustrating the hinge structure 400 in a flat state. FIG. 13 (b) is a view illustrating the hinge structure 400 in a folded state. FIG. 13 (c) is a view illustrating the hinge structure 400 in a fully folded state.

In an embodiment, the first guide rail 4301 and the second guide rail 4302 may be formed on the hinge bracket 430. In an embodiment, the first guide rail 4301 may have a substantially arc shape. For example, the center of the arc of the first guide rail 4301 may coincide with the first rotational axis R1. That is, the first guide rail 4301 may guide the first rotation member 410 such that the first rotation member 410 rotates along a rotational path whose center coincides with the first rotational axis R1.

In an embodiment, the second guide rail 4302 may have a substantially arc shape. For example, the center of the arc of the second guide rail 4302 may coincide with the second rotational axis R2. That is, the second guide rail 4302 may guide the second rotation member 420 such that the second rotation member 420 rotates along a rotational path whose center coincides with the second rotational axis R2.

In an embodiment, the first rotation member 410 may include the first extending part 412 and the first guide part 411. The first guide part 411 may have a substantially cylindrical shape. For example, the cross-section of the first guide part 411 may have a substantially arc shape. In an embodiment, the first rotation member 410 may rotate about the first rotational axis R1 in the state in which the first guide part 411 is accommodated in the first guide rail 4301 of the hinge bracket 430. For example, when the first extending part 412 is folded or unfolded together with the first housing 51, the first rotation member 410 may rotate along the rotational path having an arc shape whose center coincides with the first rotational axis R1.

In an embodiment, the second rotation member 420 may include the second extending part 422 and the second guide part 421. The second guide part 421 may have a substantially cylindrical shape. For example, the cross-section of the second guide part 421 may have a substantially arc shape. In an embodiment, the second rotation member 420 may rotate about the second rotational axis R2 in the state in which the second guide part 421 is accommodated in the second guide rail 4302. For example, when the second extending part 422 is folded or unfolded together with the second housing 52, the second rotation member 420 may rotate along the rotational path having an arc shape whose center coincides with the second rotational axis R2.

Figure 14:
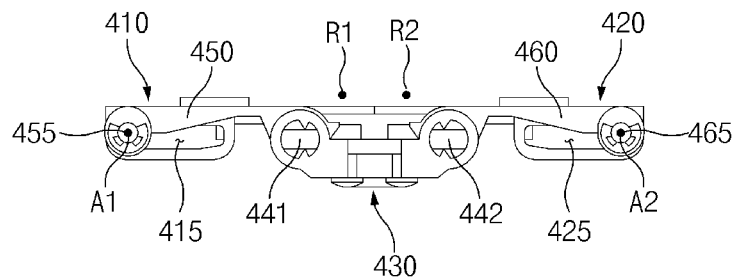
FIG. 14 is a view illustrating a rotation operation and a sliding operation of arm members and rotation members of the hinge structure according to an example embodiment.
Figure 14:
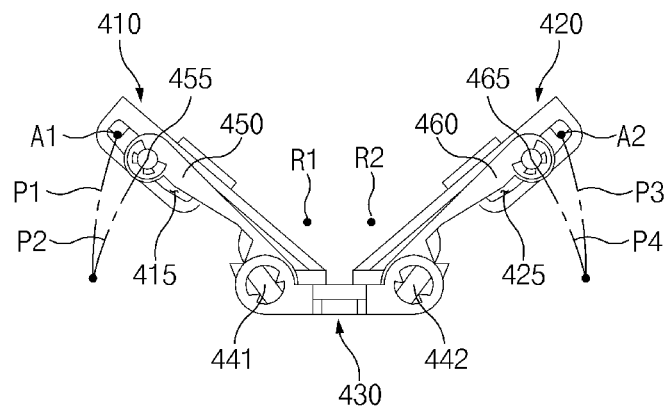
Figure 14:
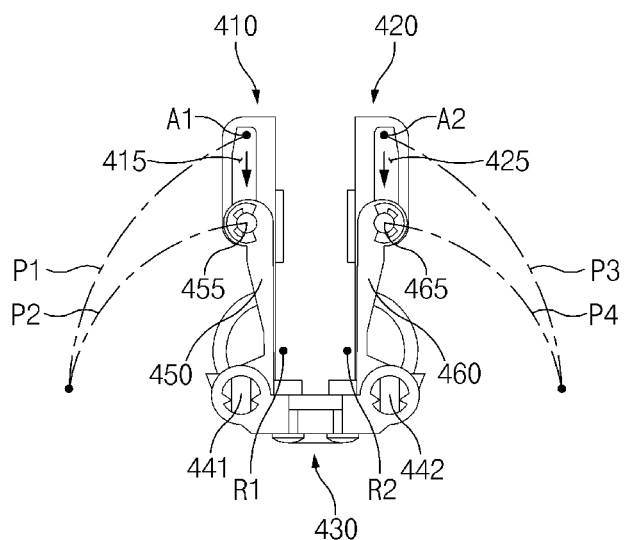

FIG. 14 is a view illustrating a rotation operation and a sliding operation of the arm members and the rotation members of the hinge structure according to an embodiment.

Figure 15:
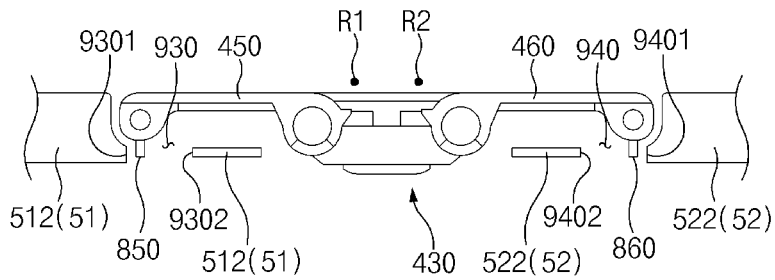
FIG. 15 is a view illustrating a rotation operation and a sliding operation of the arm members of the hinge structure and plate structures according to an example embodiment.
Figure 15:
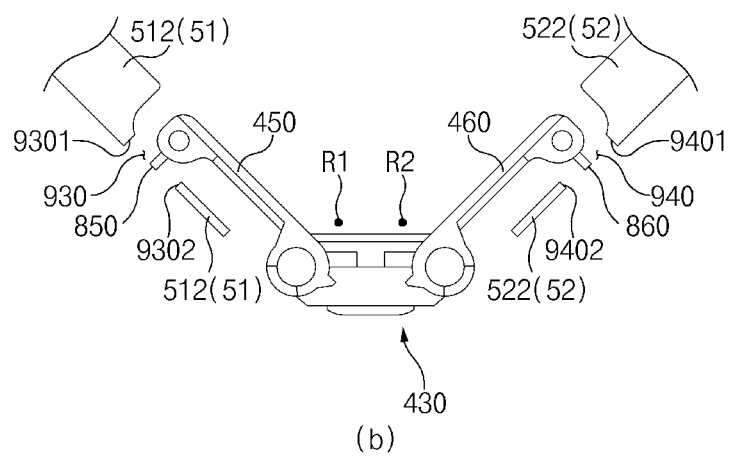
Figure 15:
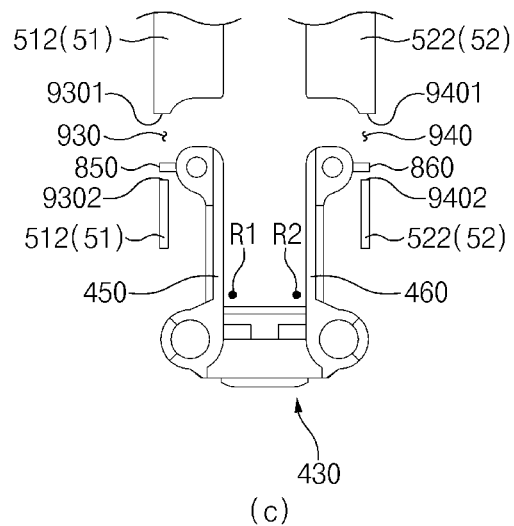

FIG. 15 is a view illustrating a rotation operation and a sliding operation of the arm members of the hinge structure and the plate structures according to an embodiment.

FIG. 14 (a) and FIG. 15 (a) are views illustrating the hinge structure 400 in a flat state. FIG. 14 (b) and FIG. 15 (b) are views illustrating the hinge structure 400 in a folded state. FIG. 14 (c) and FIG. 15 (c) are views illustrating the hinge structure 400 in a fully folded state. In FIG. 14, for convenience of description, protrusions (e.g., the protrusions 850 and 860 of FIG. 15) formed on the arm members 450 and 460 are omitted.

Referring to FIG. 14, when the hinge structure 400 is folded or unfolded, the rotation members 410 and 420 and the arm members 450 and 460 may rotate about different axes. For example, the rotation members 410 and 420 and the arm members 450 and 460 may rotate along different rotational paths. Due to the difference in the rotational path between the rotation members 410 and 420 and the arm members 450 and 460, the arm members 450 and 460 may slide when the hinge structure 400 is folded or unfolded.

In an embodiment, the first rotation member 410 may rotate about the first rotational axis R1 in a first rotational direction. For example, in a folding operation, the first rotation member 410 may rotate in the clockwise direction. For example, based on the flat state, a point where the first sliding pin 455 is located in the first rotation member 410 may be defined as a first point A1. In folding and unfolding operations, the first point A1 of the first rotation member 410 may move along a first rotational path P1.

In an embodiment, the first arm member 450 and the first sliding pin 455 may rotate about the first shaft member 441. For example, in a folding operation, the first arm member 450 and the first sliding pin 455 may rotate in the clockwise direction. For example, in the flat state, the first sliding pin 455 may be located at the first point A1, and in the folded state, the first sliding pin 455 may be located between the first point A1 and the hinge bracket 430. The first sliding pin 455 may move along a second rotational path P2 in folding and unfolding operations. In an embodiment, when a folding operation is performed in the flat state, the distance between the first sliding pin 455 and the first point A1 may increase. When an unfolding operation is performed in the fully folded state, the distance between the first sliding pin 455 and the first point A1 may decrease.

In an embodiment, the first rotational path P1 and the second rotational path P2 may differ from each other. For example, the first rotational axis R1 and the first shaft member 441 may be parallel to each other, but may not be in agreement with each other, and the radii of rotation of the first rotation member 410 and the first arm member 450 may not be in agreement with each other.

Accordingly, in folding and unfolding operations, the first arm member 450 and the first sliding pin 455 may slide relative to the first rotation member 410. A sliding operation of the second sliding pin 465 and the second arm member 460 may be guided as the second sliding pin 465 is accommodated in the second sliding groove 425 of the second rotation member 420.

When the first arm member 450 and the first sliding pin 455 slide relative to the first rotation member 410 as described above, referring to FIG. 15, the first arm member 450 and the first protrusion 850 may slide relative to the first plate structure 512 of the first housing 51. In an embodiment, the first plate structure 512 may be fixedly connected with the first rotation member 410 of FIG. 14 and may rotate with substantially the same radius of rotation as the first rotation member 410. When the first arm member 450 rotates, the first protrusion 850 may be accommodated in the first guide hole 930 of the first guide structure 512 and may slide within the first guide hole 930. For example, when the electronic device is in the flat state (a), the first protrusion 850 may be closer to the first edge 9301 than to the second edge 9302 of the first guide hole 930. When the electronic device is changed from the flat state (a) to the folded state (b), the first protrusion 850 may gradually move away from the first edge 9301 of the first guide hole 930 and may gradually approach the second edge 9302. When the electronic device is in the fully folded state (c), the first protrusion 850 may be closer to the second edge 9302 than to the first edge 9301 of the first guide hole 930.

Referring to FIG. 14, in an embodiment, the second rotation member 420 may rotate about the second rotational axis R2 in a second rotational direction. For example, in a folding operation, the second rotation member 420 may rotate in the counterclockwise direction. For example, based on the flat state, a point where the second sliding pin 465 is located in the second rotation member 420 may be defined as a second point A2. In folding and unfolding operations, the second point A2 may move along a third rotational path P3.

In an embodiment, the second arm member 460 and the second sliding pin 465 may rotate about the second shaft member 442. For example, in a folding operation, the second arm member 460 and the second sliding pin 465 may rotate in the counterclockwise direction. For example, in the flat state, the second sliding pin 465 may be located at the second point A2, and in the folded state, the second sliding pin 465 may be located between the second point A2 and the hinge bracket 430. The second sliding pin 465 may move along a fourth rotational path P4 in folding and unfolding operations. In an embodiment, when a folding operation is performed in the flat state, the distance between the second sliding pin 465 and the second point A2 may increase. When an unfolding operation is performed in the fully folded state, the distance between the second sliding pin 465 and the second point A2 may decrease.

In an embodiment, the third rotational path P3 and the fourth rotational path P4 may differ from each other. For example, the second rotational axis R2 and the second shaft member 442 may be parallel to each other, but may not be in agreement with each other, and the radii of rotation of the second rotation member 420 and the second arm member 460 may not be in agreement with each other.

Accordingly, in folding and unfolding operations, the second arm member 460 and the second sliding pin 465 may slide relative to the second rotation member 420. A sliding operation of the second sliding pin 465 and the second arm member 460 may be guided as the second sliding pin 465 is accommodated in the second sliding groove 425 of the second rotation member 420.

When the second arm member 460 and the second sliding pin 465 slide relative to the second rotation member 420 as described above, referring to FIG. 15, the second arm member 460 and the second protrusion 860 may slide relative to the second plate structure 522 of the second housing 52. In an embodiment, the second plate structure 522 may be fixedly connected with the second rotation member 420 of FIG. 14 and may rotate with substantially the same radius of rotation as the second rotation member 420. When the second arm member 460 rotates, the second protrusion 860 may be accommodated in the second guide hole 940 of the second guide structure 522 and may slide within the second guide hole 940. For example, when the electronic device is in the flat state (a), the second protrusion 860 may be closer to a first edge 9401 than to a second edge 9402 of the second guide hole 940. When the electronic device is changed from the flat state (a) to the folded state (b), the second protrusion 860 may gradually move away from the first edge 9401 of the second guide hole 940 and may gradually approach the second edge 9402. When the electronic device is in the fully folded state (c), the second protrusion 860 may be closer to the second edge 9402 than to the first edge 9401 of the second guide hole 940.

A foldable electronic device according to an embodiment (e.g., the electronic device 1 of FIG. 1) may include a hinge structure (e.g., the hinge structure 400 of FIG. 4) and a housing (e.g., the foldable housing 50 of FIG. 3) connected to the hinge structure. The hinge structure may include a shaft member (e.g., the first shaft member 441 and/or the second shaft member 442 of FIG. 4) and an arm structure connected to the shaft member and the housing such that the housing is rotatable. A guide hole (e.g., the first guide hole 930 of FIG. 9) that extends in a direction substantially perpendicular to a rotational axis of the housing may be formed in the housing. The arm structure may include a protrusion (e.g., the first protrusion 850 of FIG. 8A) accommodated in the guide hole. The protrusion may slide within the guide hole depending on rotation of the housing.

In an embodiment, the guide hole may include a first edge (e.g., the first edge 9301 of FIG. 9) and a second edge (e.g., the second edge 9302 of FIG. 9) that faces the first edge and is closer to a center of the hinge structure than the first edge, and the protrusion may move between the first edge and the second edge of the guide hole depending on the rotation of the housing.

In an embodiment, in a flat state of the electronic device, the protrusion may be closer to the first edge than to the second edge, and in a folded state of the electronic device, the protrusion may be closer to the second edge than to the first edge.

In an embodiment, the first edge may be longer than the second edge.

In an embodiment, the protrusion may have a diameter substantially the same as a length of the second edge.

In an embodiment, the guide hole may include a third edge (e.g., the third edge 9303 of FIG. 9) that connects one end of the first edge and one end of the second edge and a fourth edge (e.g., the fourth edge 9304 of FIG. 9) that connects an opposite end of the first edge and an opposite end of the second edge. The second edge may be located between the one end and the opposite end of the first edge when viewed in the direction substantially perpendicular to the rotational axis of the housing.

In an embodiment, the guide hole may include a third edge (e.g., the third edge 9303 of FIG. 12) that connects one end of the first edge and one end of the second edge and a fourth edge (e.g., the fourth edge 9304 of FIG. 12) that connects an opposite end of the first edge and an opposite end of the second edge. The third edge or the fourth edge may be substantially perpendicular to the first edge and the second edge (e.g., the first guide holes 930-1, 930-2, and 930-3 of FIG. 12).

In an embodiment, the guide hole may include a third edge (e.g., the third edge 9303 of FIG. 9) that connects one end of the first edge and one end of the second edge and a fourth edge (e.g., the fourth edge 9304 of FIG. 9) that connects an opposite end of the first edge and an opposite end of the second edge. In a folded state of the electronic device, the protrusion may be brought into contact with the third edge and/or the fourth edge.

In an embodiment, the guide hole may include a portion having a width greater than a length of a cross-section of the protrusion corresponding to a direction parallel to the rotational axis of the housing.

In an embodiment, the protrusion may have a circular cross-section (e.g., the first protrusion 850-1 of FIG. 12) or a polygonal cross-section (e.g., the first protrusions 850-2 and 850-4 of FIG. 12).

In an embodiment, the first edge and/or the second edge may include a curved surface (e.g., the first guide holes 930-3 and 930-4 of FIG. 12).

In an embodiment, the arm structure may include an arm member (e.g., the first arm member 450 and/or the second arm member 460 of FIG. 4) that is connected with the shaft member and is rotatable relative to the shaft member and a rotation member (e.g., the first rotation member 410 and/or the second rotation member 420 of FIG. 4) connected to the arm member to slide relative to the arm member and fixedly connected to the housing.

In an embodiment, the arm member my include an extending part (e.g., the first extending part 412 and/or the second extending part 421 of FIG. 4), a first part (e.g., the first part 451 of the first arm member and/or the first part 461 of the second arm member of FIG. 4) that extends from one side of the extending part in a direction substantially perpendicular to the rotational axis and surrounds the shaft member, and a second part (e.g., the third part 453 of the first arm member and/or the third part 463 of the second arm member of FIG. 4) that extends from an opposite side of the extending part in the direction substantially perpendicular to the rotational axis and that is connected with the rotation member. The protrusion may be formed on the second part of the arm member.

In an embodiment, the housing may include a frame structure (e.g., the first frame structure 511 and/or the second frame structure 521 of FIG. 3) that forms an exterior of the electronic device and a plate structure (e.g., the first plate structure 512 and/or the second plate structure 522 of FIG. 3) that extends from the frame structure toward the inside of the electronic device. The plate structure may have a recess (e.g., the recess 920 of FIG. 9) formed therein in which the arm structure is at least partially accommodated, and the guide hole may be formed in the recess of the plate structure.

In an embodiment, the electronic device may further include a flexible display (e.g., the flexible display 10 of FIG. 1) disposed on the housing.

Each embodiment herein may be used in combination with any other embodiment(s) described herein. "Based on" as used herein covers based at least on.

An electronic device according to an embodiment (e.g., the electronic device 1 of FIG. 1) may include a hinge structure (e.g., the hinge structure 400 of FIG. 4), a first housing (e.g., the first housing 51 of FIG. 3) and a second housing (e.g., the second housing 52 of FIG. 3) connected to the hinge structure with the hinge structure therebetween, and a flexible display (e.g., the flexible display 10 of FIG. 1) disposed across the first housing, the hinge structure, and the second housing. The hinge structure may include a first shaft member (e.g., the first shaft member 441 of FIG. 4), a second shaft member (e.g., the second shaft member 442 of FIG. 4), a first arm structure connected to the first shaft member and the first housing such that the first housing is rotatable, and a second arm structure connected to the second shaft member and the second housing such that the second housing is rotatable. A first guide hole (e.g., the first guide hole 930 of FIG. 9) that extends in a direction substantially perpendicular to a rotational axis of the first housing may be formed in the first housing, and the first arm structure may include a first protrusion (e.g., the first protrusion 850 of FIG. 6) accommodated in the first guide hole. A second guide hole (e.g., the second guide hole 940 of FIG. 15) that extends in a direction substantially perpendicular to a rotational axis of the second housing may be formed in the second housing, and the second arm structure may include a second protrusion (e.g., the second protrusion 860 of FIG. 6) accommodated in the second guide hole. The first protrusion may slide within the first guide hole depending on rotation of the first housing, and the second protrusion may slide within the second guide hole depending on rotation of the second housing.

In an embodiment, the first guide hole may include a first edge (e.g., the first edge 9301 of FIG. 9) and a second edge (e.g., the second edge 9302 of FIG. 9) that faces the first edge and is closer to the center of the hinge structure than the first edge, and the second guide hole may include a third edge (e.g., the first edge 9401 of FIG. 15) and a fourth edge (e.g., the second edge 9402 of FIG. 15) that faces the third edge and is closer to the center of the hinge structure than the third edge. The first protrusion may move between the first edge and the second edge of the first guide hole depending on (or based on) rotation of the first housing, and the second protrusion may move between the third edge and the fourth edge of the second guide hole depending on (or based on) rotation of the second housing.

In an embodiment, the electronic device may include a flat state (e.g., the state of the electronic device 1 of FIG. 1) in which the flexible display substantially forms one planer surface and a folded state (e.g., the state of the electronic device 1 of FIG. 2) in which the first housing and the second housing at least partially overlap each other. In the flat state, the first protrusion may be closer to the first edge than to the second edge of the first guide hole, and the second protrusion may be closer to the third edge than to the fourth edge of the second guide hole, and in the folded state, the first protrusion may be closer to the second edge than to the first edge of the first guide hole, and the second protrusion may be closer to the fourth edge than to the third edge of the second guide hole.

In an embodiment, the first edge may be longer than the second edge, and the third edge may be longer than the fourth edge.

In an embodiment, the first guide hole may include a fifth edge (e.g., the third edge 9303 and the fourth edge 9304 of FIG. 9) that connects the first edge and the second edge, and the second guide hole may include a sixth edge connecting the third edge and the fourth edge. In the folded state, the first protrusion may be brought into contact with the fifth edge of the first guide hole, and the second protrusion may be brought into contact with the sixth edge of the second guide hole.

Figure 16:
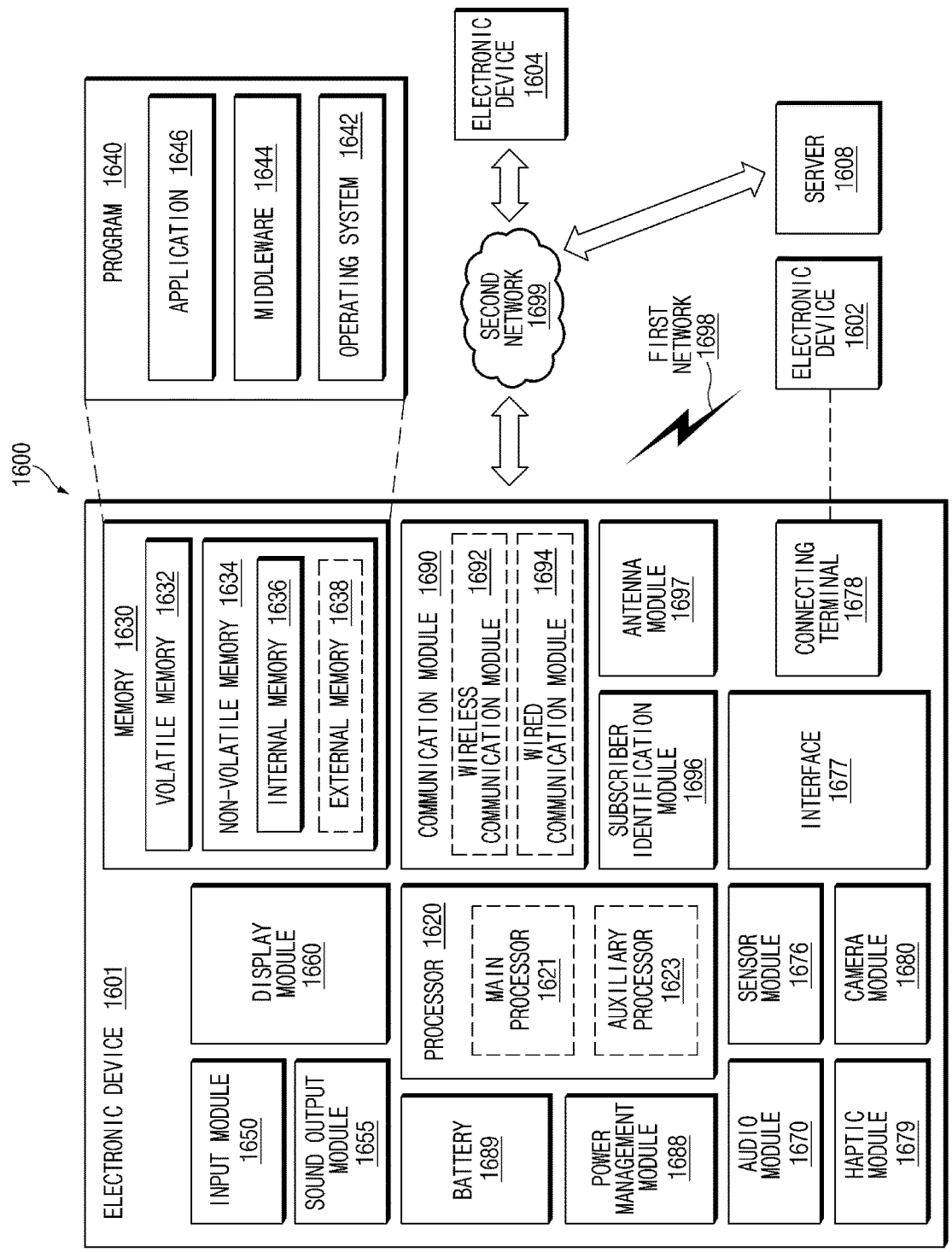
FIG. 16 is a block diagram illustrating an electronic device in a network environment 1600 according to various example embodiments.

FIG. 16 is a block diagram illustrating an electronic device 1601 in a network environment 1600 according to various embodiments.

Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to an embodiment, as at least part of the data processing or computation, the processor 1620 may store a command or data received from another component (e.g., the sensor module 1676 comprising at least one sensor, or the communication module 1690 comprising communication circuitry) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623. According to an embodiment, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment, the display module 1660 may include a touch sensor adapted to detect a touch, or a pressure sensor adapted to measure the intensity of force incurred by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to an embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 1664 dB or less) for implementing mMTC, or U-plane latency (e.g., 0.5 ms or less for each of downlink (DL) and uplink (UL), or a round trip of 16 ms or less) for implementing URLLC.

The antenna module 1697 may transmit or receive a signal or power to or from the outside (e.g., the external electronic device) of the electronic device 1601. According to an embodiment, the antenna module 1697 may include an antenna including a radiating element composed of a conductive material or a conductive pattern formed in or on a substrate (e.g., a printed circuit board (PCB)). According to an embodiment, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

According to various embodiments, the antenna module 1697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". Thus, each "module" herein may comprise circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A foldable electronic device comprising:
a hinge structure; and
a housing connected to the hinge structure,
wherein the hinge structure includes:
    a shaft; and
    an arm structure, comprising an arm, connected to the shaft and the housing such that the housing is rotatable,
    wherein a guide hole configured to extend in a direction substantially perpendicular to a rotational axis of the housing is formed in the housing,
    wherein the arm structure includes a protrusion accommodated in the guide hole, and
    wherein the protrusion is configured to slide within the guide hole based on rotation of the housing.

2. The foldable electronic device of claim 1, wherein the guide hole includes a first edge and a second edge configured to face the first edge, the second edge being closer to a center of the hinge structure than the first edge, and
    wherein the protrusion is configured to move between at least the first edge and the second edge of the guide hole based on the rotation of the housing.

3. The foldable electronic device of claim 2, wherein in a flat state of the electronic device, the protrusion is configured to be closer to the first edge than to the second edge, and
    wherein in a folded state of the electronic device, the protrusion is configured to be closer to the second edge than to the first edge.

4. The foldable electronic device of claim 2, wherein the first edge is longer than the second edge.

5. The foldable electronic device of claim 4, wherein the protrusion has a diameter substantially the same as a length of the second edge.

6. The foldable electronic device of claim 4, wherein the guide hole includes a third edge configured to connect one end of the first edge and one end of the second edge, and a fourth edge configured to connect an opposite end of the first edge and an opposite end of the second edge, and
    wherein the second edge is located between the one end and the opposite end of the first edge when viewed in the direction substantially perpendicular to the rotational axis of the housing.

7. The foldable electronic device of claim 4, wherein the guide hole includes a third edge configured to connect one end of the first edge and one end of the second edge, and a fourth edge configured to connect an opposite end of the first edge and an opposite end of the second edge, and
    wherein the third edge and/or the fourth edge is substantially perpendicular to the first edge and/or the second edge.

8. The foldable electronic device of claim 4, wherein the guide hole includes a third edge configured to connect one end of the first edge and one end of the second edge, and a fourth edge configured to connect an opposite end of the first edge and an opposite end of the second edge, and
    wherein in a folded state of the electronic device, the protrusion is configured to be brought into contact with the third edge and/or the fourth edge.

9. The foldable electronic device of claim 1, wherein the guide hole includes a portion having a width greater than a length of a cross-section of the protrusion corresponding to a direction parallel to the rotational axis of the housing.

10. The foldable electronic device of claim 1, wherein the protrusion has a circular or polygonal cross-section.

11. The foldable electronic device of claim 2, wherein the first edge and/or the second edge includes a curved surface.

12. The foldable electronic device of claim 1, wherein the arm structure includes:
    the arm being connected with the shaft, the arm being rotatable relative to the shaft; and
    a rotation member, comprising a guide and/or a coupler, connected to the arm and configured to slide relative to the arm and fixedly connected to the housing.

13. The foldable electronic device of claim 12, wherein the arm includes:
    an extending part;
    a first part configured to extend from one side of the extending part in a direction substantially perpendicular to the rotational axis and surround the shaft; and
    a second part configured to extend from an opposite side of the extending part in the direction substantially perpendicular to the rotational axis and connected with the rotation member, and
    wherein the protrusion is formed on the second part of the arm.

14. The foldable electronic device of claim 13, wherein the housing includes:
    a frame configured to form at least part of an exterior of the electronic device; and
    a plate configured to extend from the frame toward an inside of the electronic device,
    wherein the plate has a recess formed therein in which the arm structure is at least partially accommodated, and
    wherein the guide hole is formed in the recess of the plate.

15. The foldable electronic device of claim 14, further comprising:
    a flexible display disposed on the housing.

16. A foldable electronic device comprising:
a hinge structure and
a housing,
wherein the hinge structure includes:
    a shaft; and
    an arm structure, comprising an arm, connected to the shaft and the housing,
    wherein a guide hole configured to extend in a direction substantially perpendicular to a rotational axis of the housing is formed at least partially in the housing,
    wherein the arm structure includes a protrusion, and
    wherein the protrusion is configured to slide within the guide hole based on rotation of the housing.

* * * * *